US012602745B2

(12) United States Patent
Nomura

(10) Patent No.:    US 12,602,745 B2
(45) Date of Patent:    Apr. 14, 2026

(54) IMAGE PROCESSING APPARATUS, IMAGING APPARATUS, IMAGE PROCESSING METHOD

(71) Applicant: Kenichiroh Nomura, Tokyo (JP)

(72) Inventor: Kenichiroh Nomura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 166 days.

(21) Appl. No.: 18/378,152

(22) Filed: Oct. 10, 2023

(65) Prior Publication Data

US 2024/0135499 A1    Apr. 25, 2024

(30) Foreign Application Priority Data

Oct. 11, 2022    (JP) ................................. 2022-162948

(51) Int. Cl.
*G06T 5/50*        (2006.01)
*G06T 5/80*        (2024.01)
*G06V 10/25*      (2022.01)

(52) U.S. Cl.
CPC ................. *G06T 5/50* (2013.01); *G06T 5/80* (2024.01); *G06V 10/25* (2022.01); *G06T 2207/20221* (2013.01)

(58) Field of Classification Search
CPC ................... G06T 11/60; G06T 15/503; G06T 2207/20212; G06T 2207/20221; G06T 3/047; G06T 3/4038; G06T 5/00; G06T 5/80; G06V 10/25; G09G 2340/10; G09G 2340/12; G09G 5/37; H04N 13/158; H04N 23/698
See application file for complete search history.

(56) References Cited

U.S. PATENT DOCUMENTS

| | | | |
|---|---|---|---|
| 10,244,164 B1 * | 3/2019 | Banerjee | H04N 23/698 |
| 11,657,477 B2 * | 5/2023 | Yoshida | G06T 5/50 |
| | | | 382/284 |
| 2018/0191956 A1 | 7/2018 | Nomura | |
| 2021/0233209 A1 | 7/2021 | Yoshida et al. | |

FOREIGN PATENT DOCUMENTS

| | | |
|---|---|---|
| JP | 2006-135386 A | 5/2006 |
| JP | 2021-117924 A | 8/2021 |

OTHER PUBLICATIONS

Extended European Search Report issued Mar. 12, 2024 in European Patent Application No. 23202623.7, 11 pages.

* cited by examiner

*Primary Examiner* — Said Broome
(74) *Attorney, Agent, or Firm* — XSENSUS LLP

(57)        ABSTRACT

An image processing apparatus includes circuitry to input at least a first captured image and a second captured image. The first captured image and the second captured image have an overlapping area. The overlapping area in the first captured image has a plurality of target areas in each of which a stitching position is to be obtained. The plurality of target areas is arranged in an orthogonal direction with respect to a direction in which the first captured image and the second captured image are arranged and have a corresponding plurality of sizes different from each other.

17 Claims, 20 Drawing Sheets

FIG. 1A
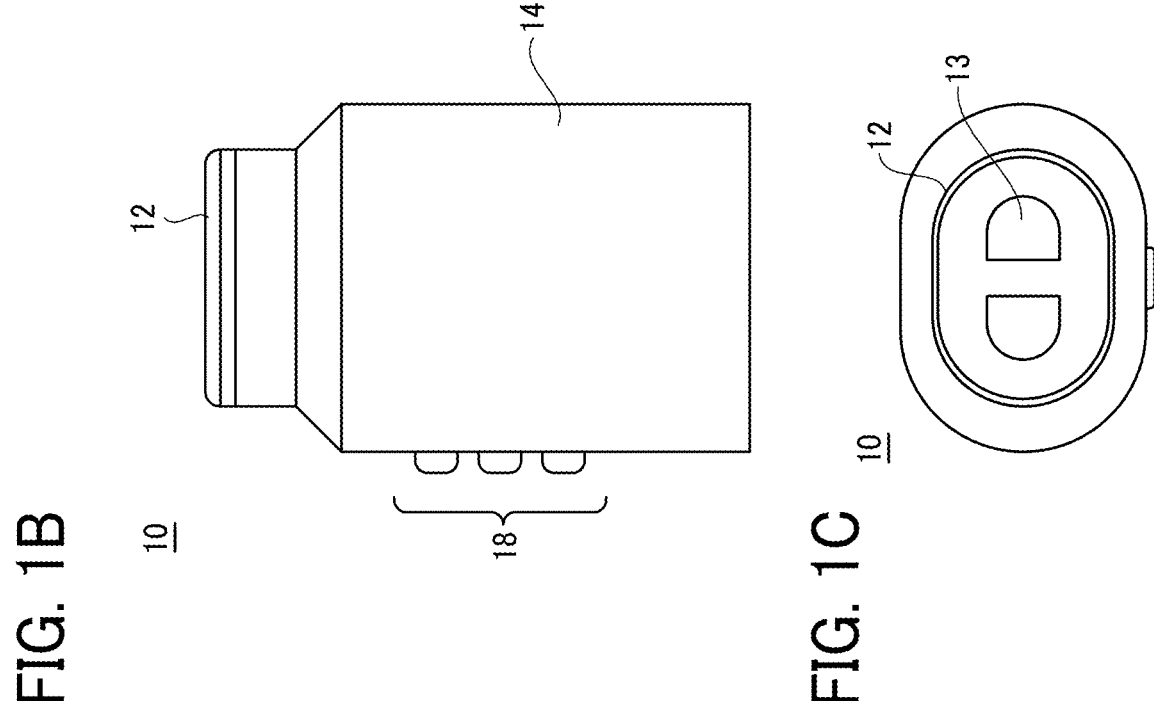
FIG. 1B
FIG. 1C
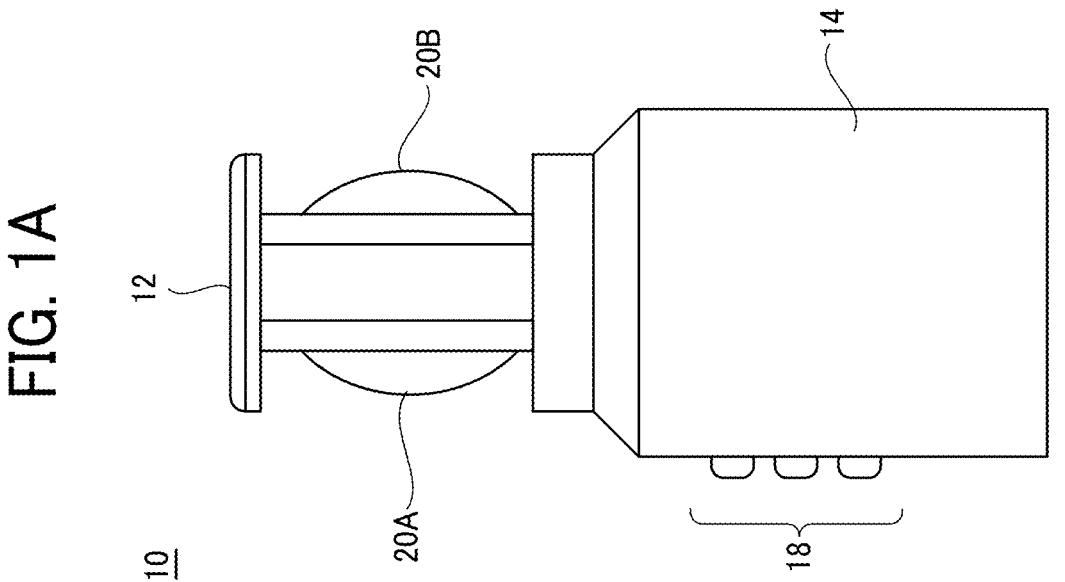

IMAGE HEIGHT h

IMAGE HEIGHT h

| COORDINATE VALUES AFTER CONVERSION | | COORDINATE VALUES BEFORE CONVERSION | |
|---|---|---|---|
| $\theta$ (pix) | $\phi$ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

SEARCH POSITION(kx, ky)

| COORDINATE VALUES AFTER CONVERSION | | STITCHING POSITION (OFFSET AMOUNT) |
|---|---|---|
| $\theta$ (pix) | $\phi$ (pix) | $\Delta\,\theta$ (pix) |
| 0 | 0 | |
| 1 | 0 | |
| ⋮ | ⋮ | ⋮ |
| 3598 | 1799 | |
| 3599 | 1799 | |

180 degrees

OFFSET
AMOUNT
(0)

CALCULATED OFFSET AMOUNT ($\Delta \theta$ i)

$d\theta$     $1-d\theta$

PIXEL POSITION FOR CALCULATION

IMAGE PROCESSING APPARATUS, IMAGING APPARATUS, IMAGE PROCESSING METHOD

CROSS-REFERENCE TO RELATED APPLICATIONS

This patent application is based on and claims priority pursuant to 35 U.S.C. § 119(a) to Japanese Patent Application No. 2022-162948, filed on Oct. 11, 2022, in the Japan Patent Office, the entire disclosure of which is hereby incorporated by reference herein.

BACKGROUND

Technical Field

The present disclosure relates to an image processing technology, and more particularly, to an image processing apparatus, an imaging apparatus, and an image processing method.

Related Art

Imaging apparatuses that capture an image in a range of 360 degrees, such as a panoramic image or a spherical image, are known. Such an imaging apparatus captures images using a plurality of wide-angle lenses or fisheye lenses. The images are stitched together, and a single image is generated, accordingly. In an image stitching technology according to a related art, distortion correction and projective transformation are performed on each of a plurality of captured images, and a stitching position where objects overlap is detected in an overlapping region of the processed images, by, for example, pattern matching.

In addition, a technology of stitching images by fixing an object distance for stitching without detecting a stitching position in order to increase the processing speed is known.

In such a related technology, an image processing apparatus includes an image input unit to which a first image and a second image are input, a storage unit that stores stitching positions of a plurality of parts between the images input to the image input unit, an evaluation unit that evaluates efficiency of previous stitching positions stored in the storage unit for each of the plurality of parts, and an image stitching processing unit that executes stitching processing based on the first image and the second image that are input to the image input unit based on the previous stitching positions, which are stored in the storage unit, for parts whose efficiency satisfies a criterion.

SUMMARY

According to an embodiment of the present disclosure, an image processing apparatus includes circuitry to input at least a first captured image and a second captured image. The first captured image and the second captured image have an overlapping area. The overlapping area in the first captured image has a plurality of target areas in each of which a stitching position is to be obtained. The plurality of target areas is arranged in an orthogonal direction with respect to a direction in which the first captured image and the second captured image are arranged and have a corresponding plurality of sizes different from each other.

According to an embodiment of the present disclosure, an imaging apparatus includes a first image capturing device to capture a first image in a first direction to generate a first captured image; and a second image capturing device to capture a second image in a second direction to generate a second captured image. The first direction and the second direction are different from each other. The first captured image and the second captured image have an overlapping area. The overlapping area in the first captured image has a plurality of target areas in each of which a stitching position is to be obtained. The plurality of target areas is arranged in an orthogonal direction with respect to a direction in which the first captured image and the second captured image are arranged and have a corresponding plurality of sizes different from each other.

According to an embodiment of the disclosure, an image processing method includes receiving an input of a first captured image and an input of a second captured image and obtaining, in the first captured image, a stitching position in an overlapping area of the first captured image and the second captured image. The overlapping area in the first captured image has a plurality of target areas in each of which a stitching position is to be obtained. The plurality of target areas is arranged in an orthogonal direction with respect to a direction in which the first captured image and the second captured image are arranged and has a corresponding plurality of sizes different from each other.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 1A, 1B, and FIG. 1C are external views of a spherical imaging device according to an exemplary embodiment of the present disclosure;

FIG. 13 is a diagram for describing a placement of objects Onear and Ofar on a screen typically seen in a use situation for a video conference performed by the video conference system illustrated in FIG. 11, according to the exemplary embodiment of the present disclosure;

FIG. 16 is a diagram illustrating a data structure of a stitching position table that including information on a stitching position for each pixel to correct a conversion table, according to the exemplary embodiment of the present disclosure;

Figure 2B:
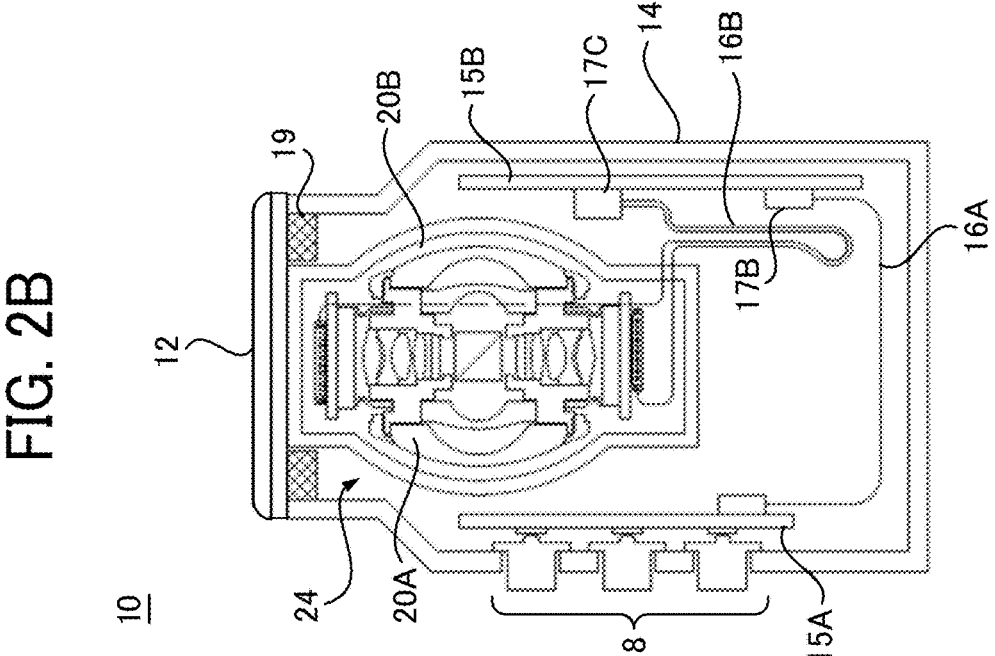
FIGS. 2A and 2B are cross-sectional views of the spherical imaging device according to the exemplary embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An embodiment according to the present disclosure is described below. However, the present disclosure is not limited to the embodiment described below. In the following description of the embodiment, a spherical imaging device 10 is used as an example of an image processing apparatus, an image processing system, or an imaging apparatus. The spherical imaging device 10 includes an imaging body including two fisheye lenses in an optical system and has an image processing function of performing distortion correction and projective transformation on two partial images captured by the two fisheye lenses and combining the images to generate a spherical image.

Overall Configuration

The overall configuration of the spherical imaging device 10 according to the present embodiment is described below with reference to FIGS. 1 (FIGS. 1A to 1C) to 3. FIG. 1A is an external view of the spherical imaging device 10 according to the present embodiment. The spherical imaging device 10 illustrated in FIG. 1A includes an imaging body 12, two image forming optical systems 20A and 20B provided in the imaging body 12, a housing 14 that holds the imaging body 12 and components such as a controller, and an operation button 18 provided on the housing 14.

FIG. 1B is an external view of the spherical imaging device 10 with the imaging body 12 stored in the housing 14.

In order to prevent dust and dirt on the two image forming optical systems 20A and 20B, the imaging body 12 is vertically movable and can be stored in the housing 14 when not in use. FIG. 1C is an external view of the spherical imaging device 10 as viewed from above. The spherical imaging device 10 has a finger groove 13, and the imaging body 12 can be manually moved up and down by a finger placed through the finger groove 13.

Figure 2A:
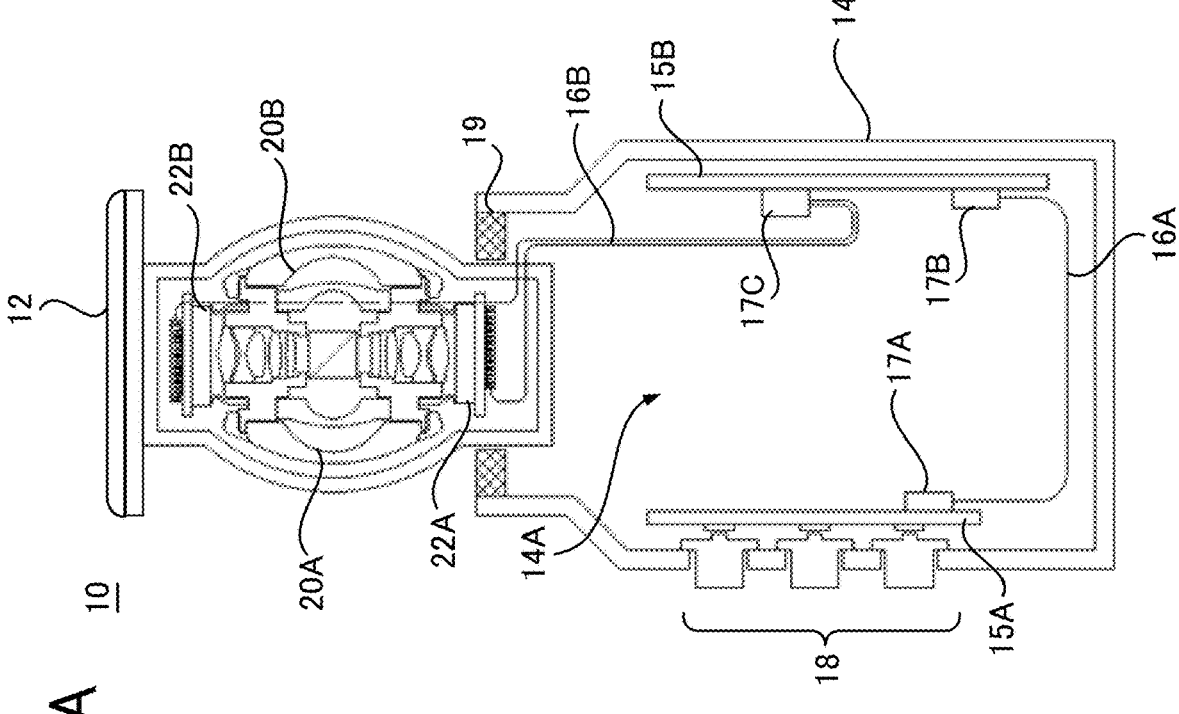

FIGS. 2A and 2B are cross-sectional views of the spherical imaging device 10 according to the present embodiment. FIG. 2A illustrates the spherical imaging device 10 with the imaging body 12 expanding from the housing 14. FIG. 2B illustrates the spherical imaging device 10 with the imaging body 12 stored in the housing 14. The imaging body 12 illustrated in FIGS. 2A and 2B includes the two image forming optical systems 20A and 20B and two solid-state imaging elements 22A and 22B such as charge-coupled device (CCD) sensors and complementary metal oxide semiconductor (CMOS) sensors. A combination of one of the image forming optical systems 20 and one of the solid-state imaging elements 22 is referred to as an imaging optical system. Each of the image forming optical systems 20 can be configured as, for example, a fisheye lens with six groups and seven elements. In the present embodiment illustrated in FIGS. 1A to 1C and 2A and 2B, the fish eye lens has a total angle of view greater than 180 degrees (=360 degrees/n; n=2), preferably has an angle of view of 185 degrees or more, and more preferably has an angle of view of 190 degrees or more.

The positional relationship between the optical elements (lenses, prisms, filters, and aperture stops) of the two image forming optical systems 20A and 20B is determined with respect to the solid-state imaging elements 22A and 22B. The positioning is performed such that the optical axes of the optical elements of each of the image forming optical systems 20A and 20B is positioned so as to be orthogonal to the center of the light receiving area of corresponding one of the solid-state imaging elements 22, and such that the light receiving area serves as the imaging plane of corresponding one of the fisheye lenses. Each of the solid-state imaging elements 22 is a two-dimensional solid-state imaging element in which a light receiving area forms an area, and converts light condensed by corresponding one of the image forming optical systems 20, which is combined, into an image signal.

In the present embodiment illustrated in FIGS. 1A to 1C and 2A and 2B, the image forming optical systems 20A and 20B have the same specifications, and are set to be combined in opposite directions so that the optical axes coincide with each other. The solid-state imaging elements 22A and 22B convert the received light distribution into image signals and output the image signals to an image processing device on controllers 15A and 15B. The image processing device stitches and combines the partial images input from the solid-state imaging elements 22A and 22B to generate an image with a solid angle of 4π steradians (in the following description, the generated image is referred to as a "spherical image"). The spherical image is obtained by capturing all directions that can be seen from an image capturing point. In the present embodiment illustrated in FIGS. 1A to 1C and 2A and 2B, the spherical image is generated, but an image obtained by capturing a horizontal plane in 360 degrees, a so-called panoramic image, may be generated. In the description of the present embodiment, an image in which a partial area of the spherical image is missing is also referred to a panoramic image for the sake of convenience. For example, the panoramic image is an image of 360 degrees in the horizontal direction and less than 180 degrees in the vertical direction, and includes an image in which a partial area is missing in the direction directly above or directly below the spherical imaging device 10, an image in which a partial area is missing in a vertically upward direction or a vertically downward direction of the spherical image, and an image in which a part of a predetermined area of the spherical image is missing. Regarding this, it is considered that a user usually does not carefully view a part that is directly above (for example, a ceiling of a room) or directly below (for example, ground) of an object captured in the spherical image when the user views a 4π steradian image, for example. In such a case, the imaging body 12 and the housing 14 may be designed such that the above-described part is not to be captured. Alternatively, the above-described part may not be displayed, or the above-above described part may be displayed with a predetermined logo or information, such as a link to a predetermined web site, in a manner that such information is displayed on the above-described part in a superimposed manner, so that a 4π steradian image may not be displayed as it is.

The housing 14 of the spherical imaging device 10 includes the controllers 15A and 15B that perform input of control information from the operation button 18, execution of image processing based on image signals of the solid-state imaging elements 22A and 22B, and input and output of a processing result, for example. The controllers 15A and 15B are provided with connectors 17 (connectors 17A, 17B, 17C). The controllers 15 or the controllers 15 and the solid-state imaging elements 22 (solid-state imaging elements 22A and 22B) are connected through a cable 16 (cables 16A and 16B) and the connector 17. The cable 16 is a flexible flat cable (FFC) or a flexible printed circuit (FPC), for example.

FIG. 2B is a cross-sectional view of the spherical imaging device 10 with the imaging body 12 stored in the housing 14. An elastic member 19 such as rubber or sponge is provided to prevent the two image forming optical systems 20 (20A and 20B) from being damaged and to prevent dust from entering the housing 14 when the imaging body 12 is stored in or expanded from the housing 14.

Figure 3:
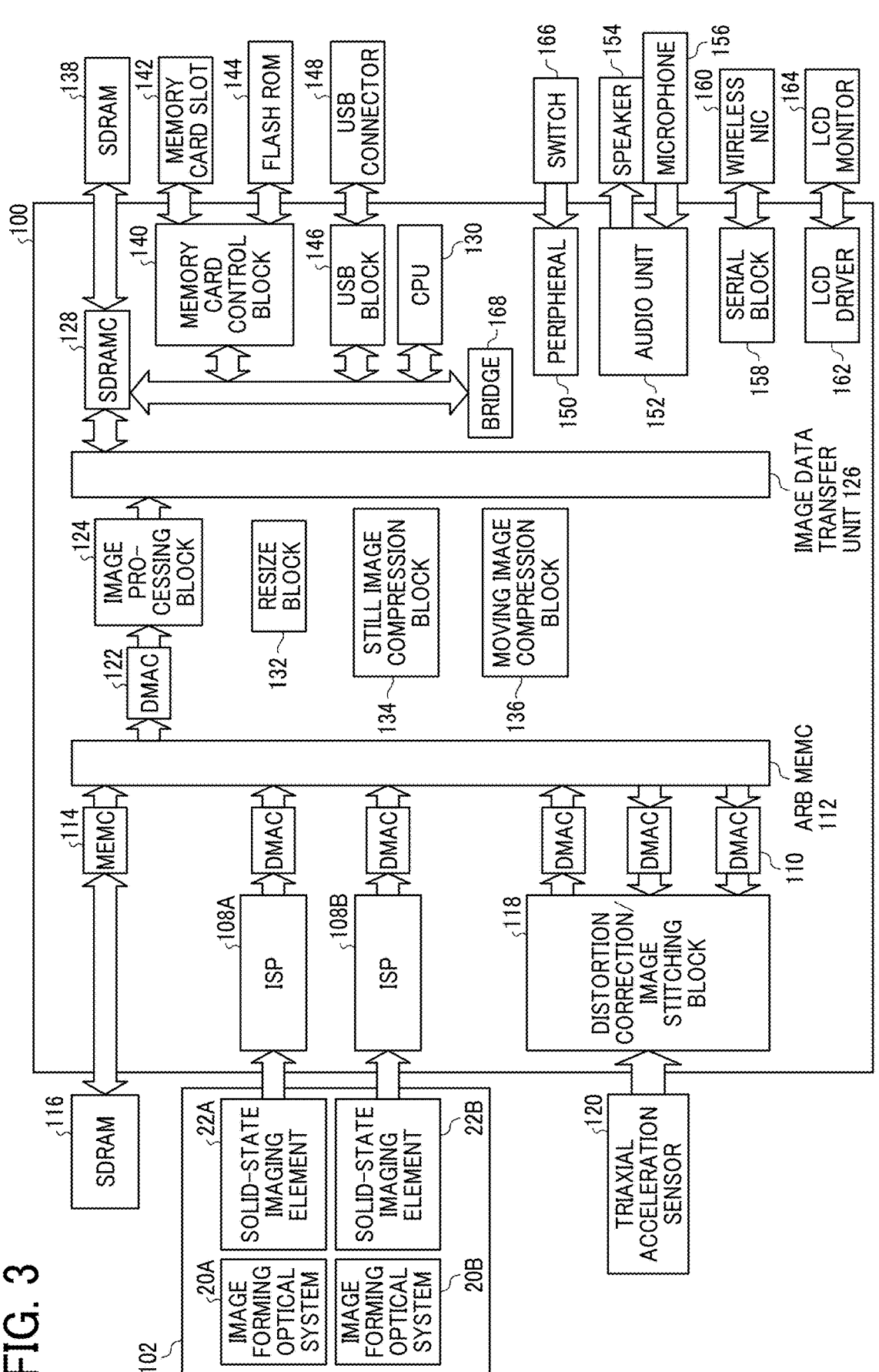
FIG. 3 is a block diagram illustrating a hardware configuration of the spherical imaging device according to the exemplary embodiment of the present disclosure.

FIG. 3 is a block diagram illustrating a hardware configuration of the spherical imaging device 10 according to the present embodiment. The spherical imaging device 10 includes a digital still camera processor (hereinafter, referred to simply as a processor) 100, a lens barrel unit 102, and various components connected to the processor 100. The lens barrel unit 102 includes the above-described two pairs of the image forming optical systems 20 and the solid-state imaging elements 22, namely the pair of the image forming optical system 20A and the solid-state imaging element 22A, and the other pair of the image forming optical system 20B and the solid-state imaging element 22B. The solid-state imaging element 22 is controlled by a control command from a central processing unit (CPU) 130, which is described later, in the processor 100.

The processor 100 includes an image signal processor (ISP) 108, a direct memory access controller (DMAC) 110, an arbiter (ARBMEMC) 112 for arbitrating memory access, a memory controller (MEMC) 114 for controlling memory access, and a distortion correction/image stitching block 118. The ISPs 108A and 108B perform white balance setting and gamma setting on the image data processed by the solid-state imaging elements 22A and 22B, respectively. A synchronous dynamic random access memory (SDRAM) 116 is connected to the MEMC 114. In the SDRAM 116, data is temporarily stored when the ISP 108A or 108B, or the distortion correction/image stitching block 118 performs processing. The distortion correction/image stitching block 118 performs distortion correction and vertical perspective correction on the two partial images obtained from the two imaging optical systems using information from a triaxial acceleration sensor 120, and combines, or stitches, the images.

The processor 100 further includes a DMAC 122, an image processing block 124, the CPU 130, an image data transfer unit 126, a synchronous dynamic random access memory controller (SDRAMC) 128, a memory card control block 140, a universal serial bus block 146, a peripheral block 150, an audio unit 152, a serial block 158, a liquid crystal display (LCD) driver 162, and a bridge 168.

The CPU 130 controls the operation of each component of the spherical imaging device 10. The image processing block 124 performs various types of image processing on the image data using a resize block 132, a still image compression block 134, or a moving image compression block 136, for example. The resize block 132 is a block for enlarging or reducing an image data size by interpolation processing. The still image compression block 134 is a codec block that compresses or expands a still image into a still image format such as Joint photographic experts group (JPEG) or tagged image file format (TIFF). The moving image compression block 136 is a codec block that compresses or decompresses a moving image in a moving image format of moving picture experts group (MPEG)-4 advanced video coding (AVC)/H.264, for example. The image data transfer unit 126 transfers the image processed by the image processing block 124. The SDRAMC 128 controls an SDRAM 138 connected to the processor 100, and the SDRAM 138 temporarily stores the image data when the image data is processed in various ways in the processor 100.

The memory card control block 140 controls reading and writing with respect to a memory card or a flash read only memory (ROM) 144 inserted into a memory card slot 142. The memory card slot 142 is a slot that allows a memory card to be detachably attached to the spherical imaging device 10. A universal serial bus (USB) block 146 controls USB communication with an external device such as a personal computer connected via a USB connector 148. A power switch 166 is connected to the peripheral block 150. The audio unit 152 is connected to a microphone 156 through which an audio signal is input and a speaker 154 through which a recorded audio signal is output, and controls audio input and output. The serial block 158 controls serial communication with an external device such as a personal computer, and is connected to a wireless network interface card (NIC) 160. The LCD driver 162 is a drive circuit for driving an LCD monitor 164 and converts the signal into a signal for displaying various states on the LCD monitor 164.

The flash ROM 144 stores a control program described in a code that can be decoded by the CPU 130 and various parameters. When the power switch 166 is operated to turn on the power supply, the control program is loaded into a main memory. The CPU 130 controls the operation of each component of the device in accordance with the program read into the main memory, and temporarily stores information used for the control in the SDRAM 138 and a local static random access memory (SRAM).

Figure 4:
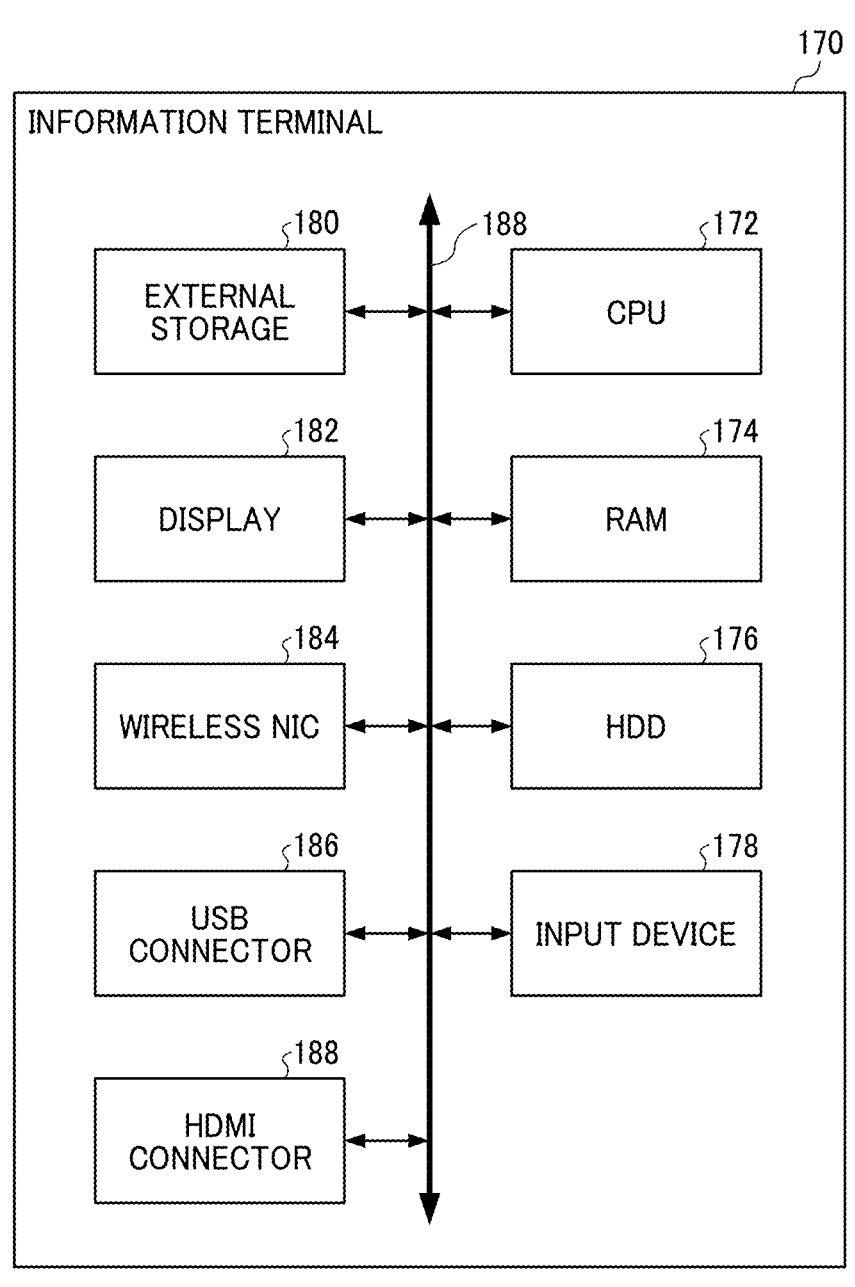
FIG. 4 is a block diagram illustrating a hardware configuration of an information terminal that can be used to control the spherical imaging device according to the exemplary embodiment of the present disclosure.

FIG. 4 is a block diagram illustrating a hardware configuration of an information terminal 170 that can be used to control the spherical imaging device 10 according to the present embodiment. The information terminal 170 illustrated in FIG. 4 includes a CPU 172, a random access memory (RAM) 174, a hard disk drive (HDD) 176, an input device 178, external storage 180, a display 182, a wireless NIC 184, a USB connector 186, and a HIGH-DEFINITION MULTIMEDIA INTERFACE (HDMI) connector 188 (HDMI is a registered trademark).

The CPU 172 controls the operation of each component and the overall operation of the information terminal 170. The RAM 174 provides a working area for the CPU 172. The HDD 176 stores programs, which are described in a code that can be decoded by the CPU 172, and such programs include an operating system and an application for processing performed on the information terminal 170 according to the present embodiment.

The input device 178 is an input device such as a mouse, a keyboard, a touch pad, or a touch screen, and provides a user interface. The external storage 180 is a removable recording medium attached to, for example, a memory card slot, and records various types of data such as moving image data or still image data. The wireless NIC 184 establishes connection of wireless local area network (LAN) communication with an external device such as the spherical imaging device 10. The USB connector 186 establishes a USB connection with an external device such as the spherical imaging device 10. Although each of the wireless NIC 184 and the USB connector 186 is illustrated as an example, the present embodiment is not limited to a specific standard, and the external device may be connected by other wireless communication such as BLUETOOTH (registered trademark) or a wireless USB, or wired communication such as a wired LAN.

The display 182 displays an operation screen to be operated by a user, displays a monitor image of an image captured by the spherical imaging device 10 before or during image capturing, and displays a stored moving image or still image to be played back or viewed. With the display 182 and the input device 178, the user can instruct the spherical imaging device 10 to capture an image and change various settings via the operation screen. In addition, the videos can be output to a display device such as an external display or a projector by the HDMI (registered trademark) connector 188. Although the HDMI (registered trademark) connector 188 is illustrated as an example, the present embodiment is not limited to a specific standard, and may use a configuration with DISPLAYPORT (registered trademark) or digital visual interface (DVI).

When the information terminal 170 is powered on, the program is read from the ROM or the HDD 176 and loaded into the RAM 174. The CPU 172 controls the operation of each component of the device in accordance with the program read into the RAM 174, and temporarily stores information used for the control in a memory. Accordingly, the information terminal 170 implements functional units and processing, which are described later.

Image Stitching for Moving Image

Figure 5:
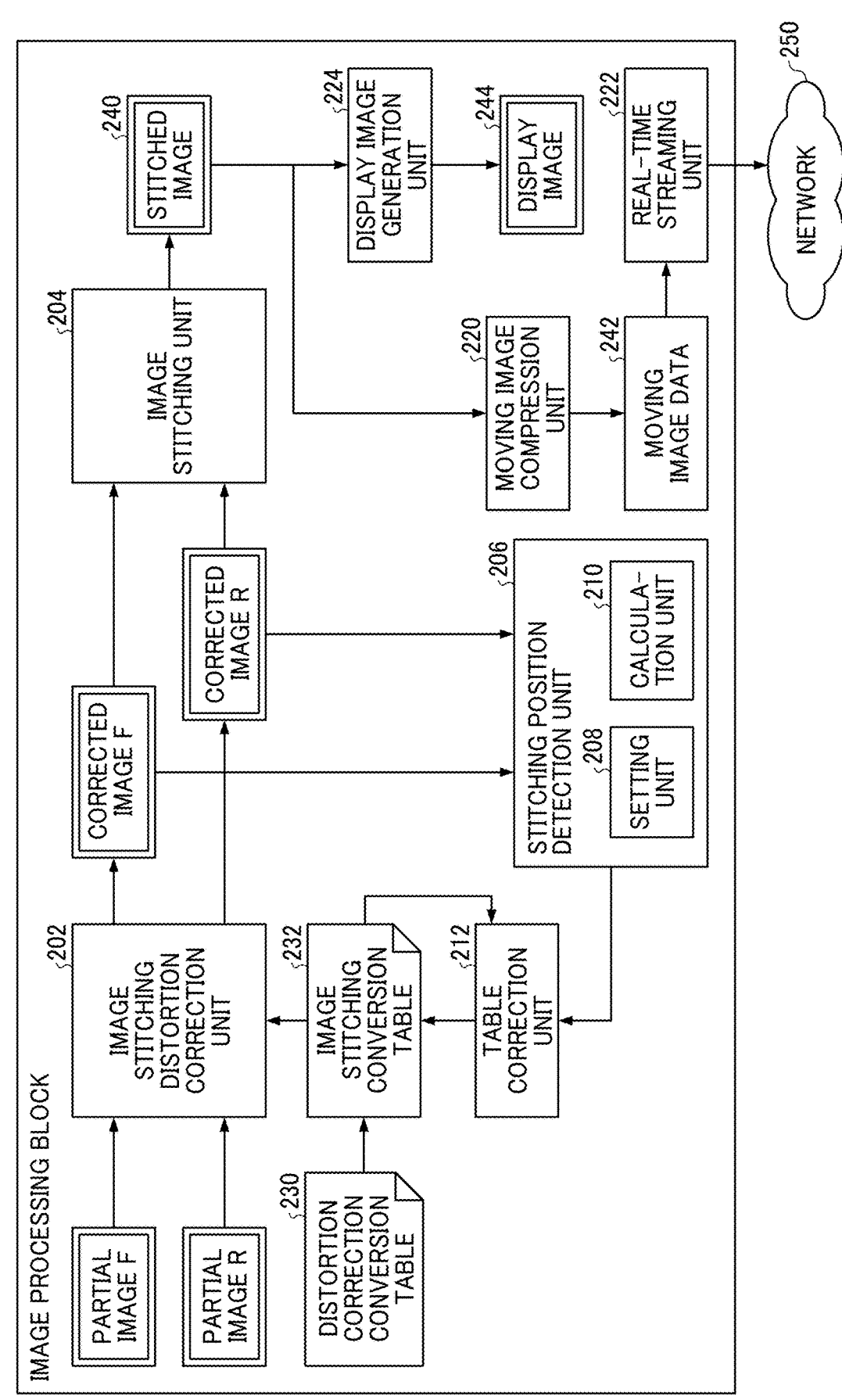
FIG. 5 is a block diagram illustrating functional units for image stitching for a spherical moving image, implemented on the spherical imaging device according to the exemplary embodiment of the present disclosure.

A spherical-moving-image stitching function of the spherical imaging device 10 is described below in detail with reference to FIGS. 5 to 10. FIG. 5 is a block diagram illustrating functional units for image stitching for a spherical moving image, implemented on the spherical imaging device 10 according to the present embodiment. As illustrated in FIG. 5, an image processing block 200 includes an image stitching distortion correction unit 202, an image stitching unit 204, a stitching position detection unit 206, and a table correction unit 212. The image stitching distortion correction unit 202 is a distortion correction unit for image stitching.

The image processing block 200 receives two partial images for each frame from the two solid-state imaging elements 22A and 22B through various image signal processing. In the description of the present embodiment, an image for a frame and of which a source is one of the solid-state imaging elements (for example, the solid-state imaging element 22A) is referred to as a "partial image F," and another image for the frame, and of which a source is the other one of the solid-state imaging elements (for example, the solid-state imaging element 22B) is referred to as a "partial image R." In the present embodiment, one of the two solid-state imaging elements 22A and 22B serves as a first imaging element for capturing an image in a first direction and generating a first image, and the other serves as a second imaging element for capturing an image in a second direction that is different from the first direction (for example, a direction different from the first direction by 180°) and generating a second image. The image processing block 200 is further provided with a distortion correction conversion table 230 generated in advance in a manufacture, in accordance with a predetermined projection model based on design data of an optical system such as each lens, for example. The distortion correction conversion table 230 is a conversion table for distortion correction.

The image stitching distortion correction unit 202 performs distortion correction on the partial image F and the partial image R, which are input, using an image stitching conversion table 232 to generate a corrected image F and a corrected image R. The image stitching conversion table 232 is a conversion table for image stitching. The input partial images F and R are image data represented by a plane coordinate system (x, y). The corrected images F and R obtained after the distortion correction using the image stitching conversion table 232 are image data in a spherical image format represented by a spherical coordinate system (a polar coordinate system having a radius vector of 1 and two arguments θ and φ). In the present embodiment, the image stitching distortion correction unit 202 serves as a distortion correction unit. The distortion correction conversion table 230 and the image stitching conversion table 232 are described later.

Projection Method

Figure 6A:
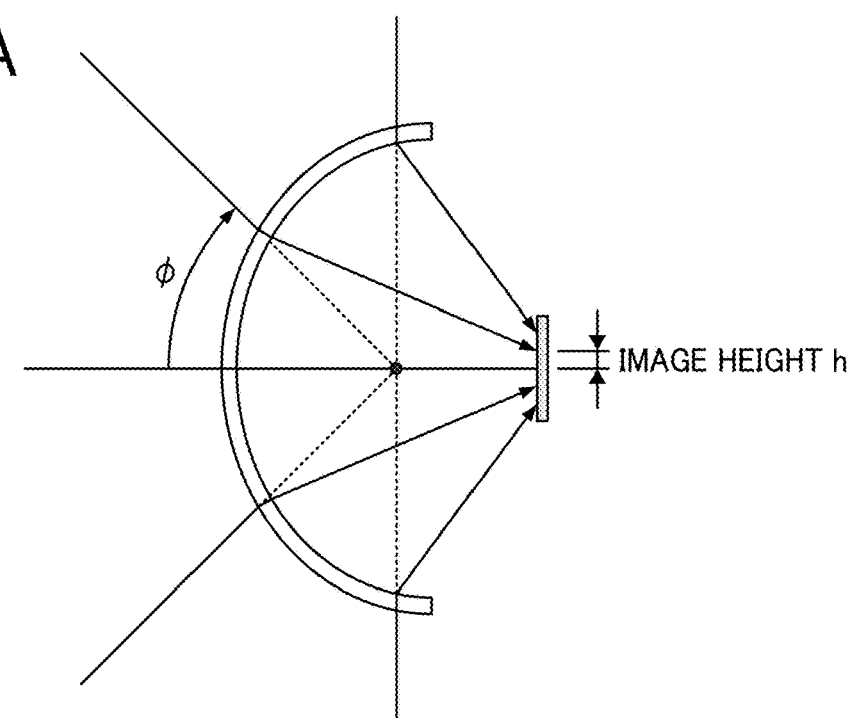
FIGS. 6A and 6B are diagrams each illustrating a projection relation in the spherical imaging device according to the exemplary embodiment of the present disclosure.
Figure 6B:
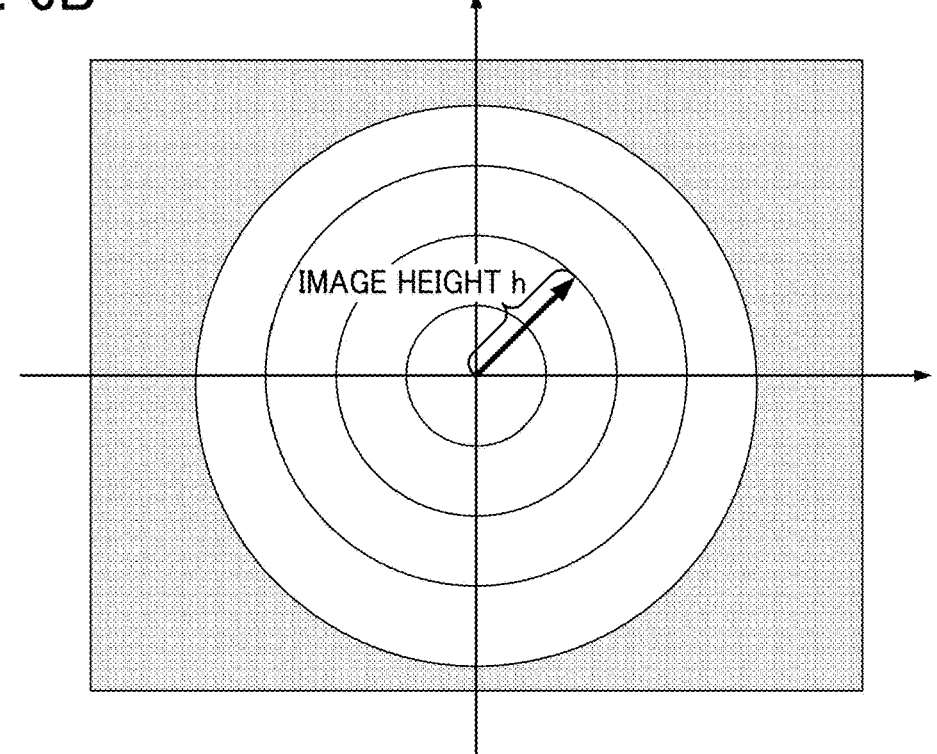

FIGS. 6A and 6B are diagrams each illustrating a projection relation in the spherical imaging device 10 according to the present embodiment. An image captured by one fisheye lens is obtained by capturing an image of an orientation corresponding to approximately a hemisphere from the image capturing point. As illustrated in FIG. 6A, with the fisheye lens, an image having an image height h that corresponds to an angle of incidence φ with respect to an optical axis. The relation between the image height h and the angle of incidence φ is determined by a projection function according to a prescribed projection model. The projection function varies according to the properties and characteristics of the fisheye lens. Examples of the projection model include the equidistant projection (h=f×φ), the central projection (h=f·tan φ), the stereographic projection (h=2f·tan (φ/2)), the equi-solid-angle projection (h=2f·sin (φ/2)), and the orthogonal projection (h=f·sin φ). In any of the projections, the image height h of a formed image is determined according to the incident angle φ and the focal length f relative to the optical axis. Further, in the present embodiment, it is assumed that a so-called circular fisheye lens having an image circle diameter shorter than a diagonal line of an image is adopted. As illustrated in FIG. 6B, a partial-view image obtained with such a lens is a planar image, which includes the entire image circle in which a part of the imaging range corresponding nearly to a hemisphere is projected.

Spherical Image Format

Figure 7A:
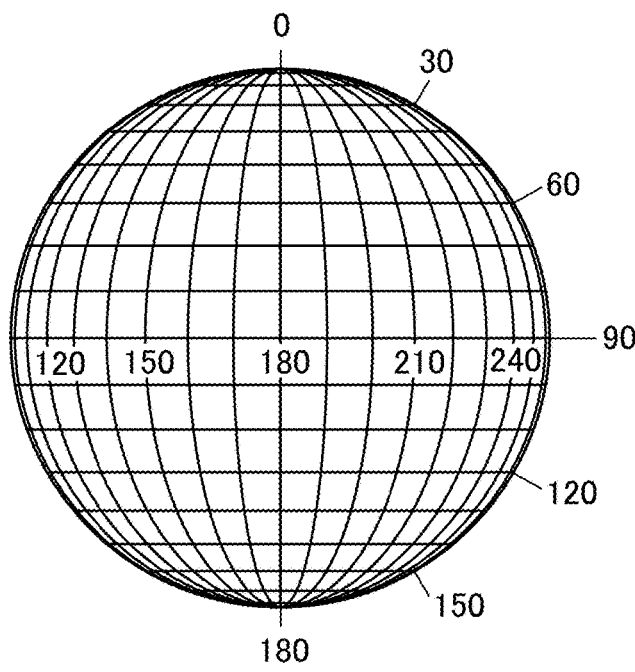
FIGS. 7A and 7B are diagrams each illustrating a data structure of image data in a spherical image format according to the exemplary embodiment of the present disclosure.
Figure 7B:
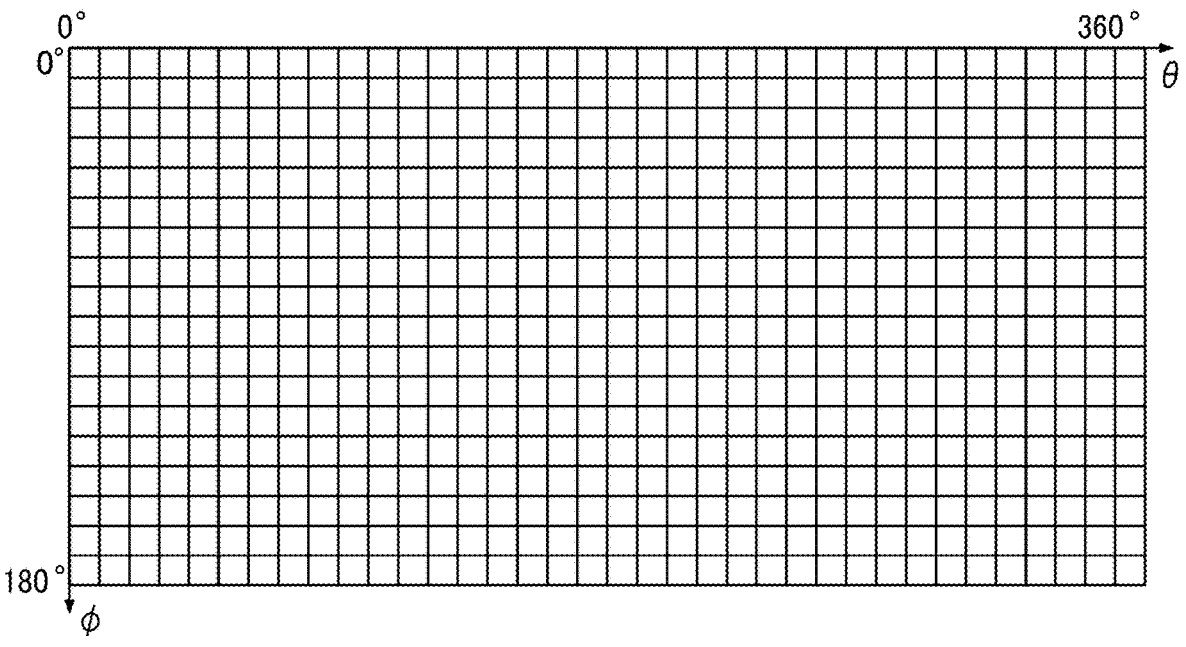

FIGS. 7A and 7B are diagrams each illustrating a data structure of image data in a spherical image format, according to the present embodiment. As illustrated in FIG. 7B, the image data in the spherical image format is expressed as an array of pixel values where the vertical angle φ corresponding to the angle with respect to a certain axis and the horizontal angle θ corresponding to the angle of rotation around the axis are the coordinates. The horizontal angle θ ranges from 0 to 360 degrees (alternatively, expressed as from –180 to +180 degrees). In a similar manner, the vertical angle φ ranges from 0 to 180 degrees (alternatively, expressed as from –90 to +90 degrees). The respective coordinate values (θ, φ) are associated with the points on the spherical surface representing all directions from the image capturing point. Thus, the all directions are mapped on the spherical image. The planar coordinates of an image that is captured by a fisheye lens can be associated with the coordinates on the spherical surface in the spherical image format by using the projection function as described above with reference to FIGS. 6A and 6B.

Conversion Table

Figures 8A, 8B:
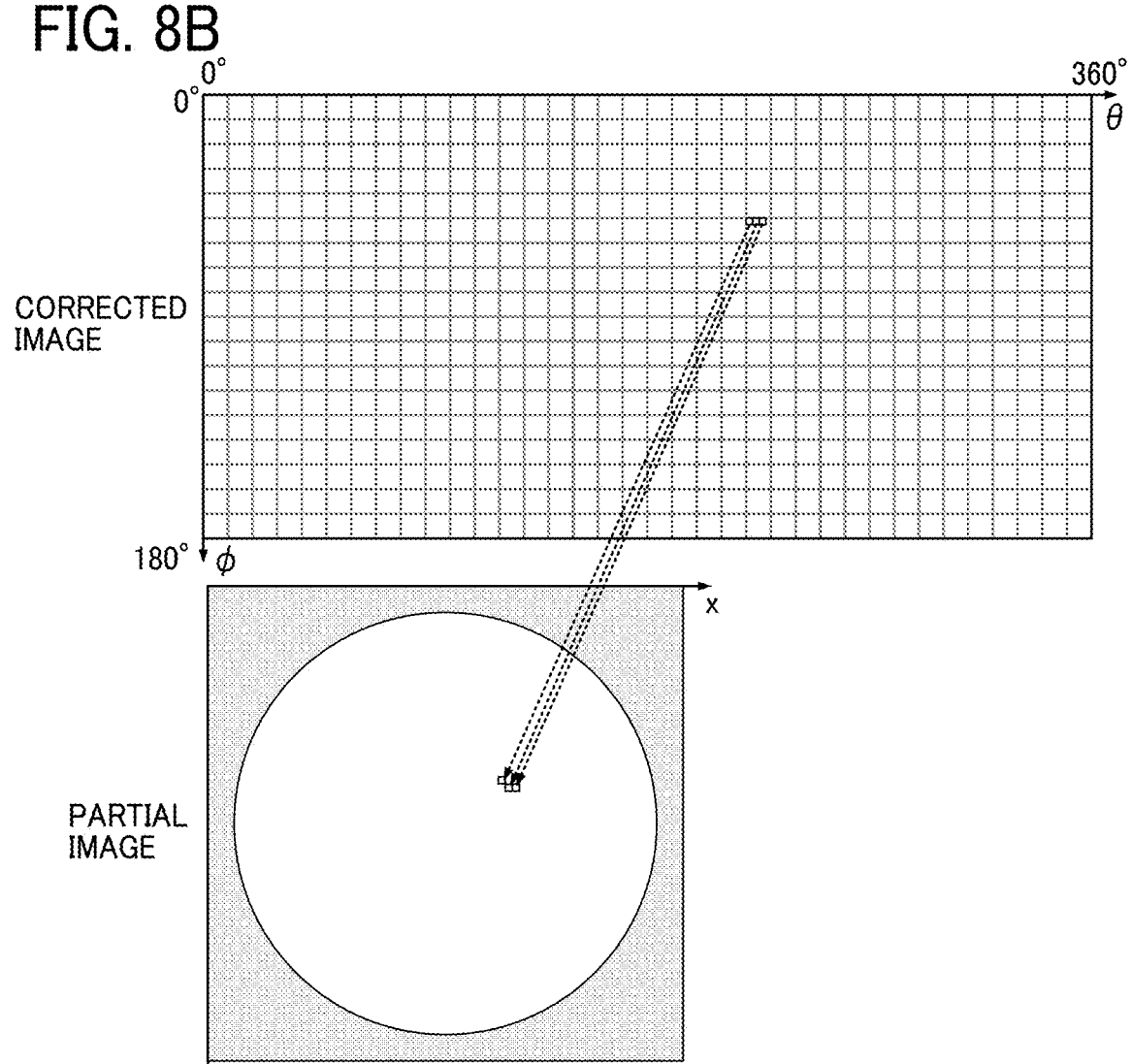
FIGS. 8A and 8B are diagrams for describing conversion data according to the exemplary embodiment of the present disclosure.

FIGS. 8A and 8B are diagrams for describing a conversion table referred by the image stitching distortion correction unit 202 according to the present embodiment. The distortion correction conversion table 230 and the image stitching conversion table 232 define a projection to an image represented by the spherical coordinate system based on a partial image represented by the plane coordinate system. As illustrated in FIGS. 8A and 8B, the distortion correction conversion table 230 and the image stitching conversion table 232 hold information in which coordinate values (θ, φ) of a post-correction image and coordinate values (x, y) of a pre-correction partial image that is to be mapped on the coordinate values (θ, φ) are associated with each other, for all the coordinate values (θ, φ), where θ denotes 0 to 360 degrees and φ denotes 0 to 180 degrees. In the example illustrated in FIGS. 8A and 8B, the angle of each one of the pixels is one-tenth of a degree in both φ direction and θ direction. Each of the distortion correction conversion table 230 and the image stitching conversion table 232 has information indicating a correspondence relationship of 3600×1800 for each fisheye lens.

The distortion correction conversion table 230 is calculated and tabulated after correcting distortion from an ideal lens model in a manufacture in advance, for example. The initial value of the image stitching conversion table 232 is the distortion correction conversion table 230, and is used for the first frame and several frames subsequent to the first frame in sequential order. For further subsequent frames after the several frames, the table correction unit 212 uses the image stitching conversion table 232 that is updated by using the previous image stitching conversion table 232 that is used last time and a stitching position detection result obtained by the stitching position detection unit 206. A detailed description of this is given later.

Corrected Image

Although details are described later, the stitching position detection unit 206 receives input of the corrected images F and R that are converted by the image stitching distortion correction unit 202, detects a stitching position for stitching the input corrected images F and R by pattern matching processing, and generates stitching position information. The table correction unit 212 updates the image stitching conversion table 232 based on the stitching position information and the previous image stitching conversion table 232 that is used last time.

Figure 9:
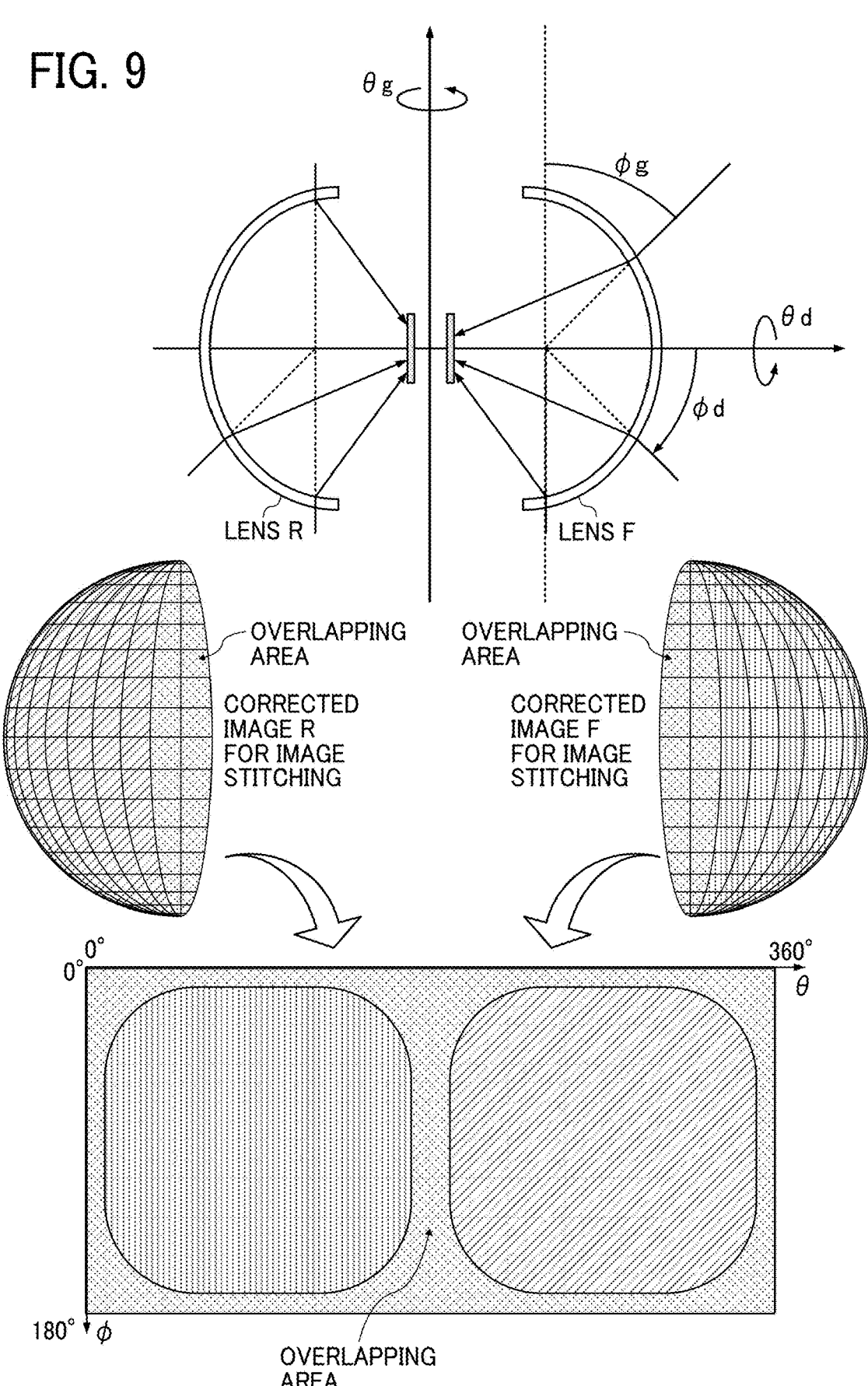
FIG. 9 is a diagram for describing mapping of two partial images captured by two fisheye lenses to a spherical coordinate system in stitching position detection and image stitching according to the exemplary embodiment of the present disclosure.

FIG. 9 is a diagram for describing mapping of two partial images captured by two fisheye lenses to a spherical coordinate system in stitching position detection and image stitching according to the present embodiment.

As illustrated in FIG. 9, the horizontal angle and the vertical angle are defined based on the axis perpendicular to the optical axis.

As a result of processing of the image stitching distortion correction unit 202, the two partial images F and R captured by the fisheye lenses are expanded on a spherical image format as illustrated in FIG. 9. The partial image F captured by a fisheye lens F is typically mapped substantially the left hemisphere of the entire celestial sphere, and the partial image R captured by a fisheye lens R is mapped to substantially the right hemisphere of the entire celestial sphere.

The image stitching unit 204 combines, or stitches, the corrected image F and the corrected image R to generate a frame of a stitched image 240. The stitched image 240 may be referred to as a combined image 240. The image stitching unit 204 serves as an image stitching processing unit that combines, or stitches, the corrected image F and the corrected image R, which are input, based on the stitching position obtained by the stitching position detection unit 206. The stitched image 240 is an image in a spherical image format and is an image represented by a polar coordinate system having two arguments. In the present embodiment, the image stitching unit 204 is provided in the image processing block 200 implemented on the spherical imaging device 10. However, in some embodiments, the image stitching unit 204 may be provided in an external device. For example, the processing up to the generation of the corrected image may be performed on the spherical imaging device 10, and processing of image stitching may be performed on another terminal (for example, the information terminal 170). In this case, an image processing system is configured by combining the spherical imaging device 10 and the information terminal 170 that includes the image stitching unit 204.

Moving Image Streaming

The image processing block 200 illustrated in FIG. 5 may further include a moving image compression unit 220 and a real-time streaming unit 222.

The moving image compression unit 220 receives input of an image sequence of a plurality of composite frames that are spherical images, which are obtained by image stitching. The moving image compression unit 220 generates a moving image, or a video, having the plurality of composite frames included in the image sequence by moving image compression and outputs moving image data 242. The real-time streaming unit 222 transmits the moving image data to a network 250 while sequentially reading the moving image data 242, and performs moving image streaming (video streaming) in real time to a remotely connected device at a different site, for example. At the time of moving image streaming, moving image data may be transmitted from the spherical imaging device 10 to a device at a different site via the information terminal 170 or directly.

Image Display and Storage

The image processing block 200 illustrated in FIG. 5 may further include a display image generation unit 224. When the generated stitched image represented by the spherical image format is displayed on a flat display device, such as a display, without being additionally processed, the image is displayed with distortion as the vertical angle approaches 0 degree and 180 degrees. The display image generation unit 224 is a unit that performs image processing for projecting the spherical image on such a flat display device.

The display image generation unit 224 can perform processing of sequentially converting the stitched images in the spherical image format from the spherical coordinate system to a planar coordinate system that has a specific direction and a specific angle of view, and projecting the converted stitched image onto an image having a constant angle of view in a specific viewing direction designated by the user. This allows the viewer to view the moving image with an equivalent sensation of observing what he or she views at a predetermined viewpoint and field of view.

In addition to the above-described real-time streaming, a moving image may be generated by moving image com- Stitching Position Detection Process In the spherical imaging device 10, the plurality of image forming optical systems 20 typically has parallax, and a position of an object may change in accordance with an object distance, in the overlapping area where the two images overlap, accordingly. In the spherical imaging device 10, the stitching position detection unit 206 detects a stitching position in the overlapping area of the corrected image F and the corrected image R, and generates the stitching position information. In the description of the present embodiment, the stitching position information is calculated by template matching as an offset amount from a reference position that is a position at which a matching score between a template image cut out from one image and a corresponding search range of the other image is maximum.

Figure 10A:
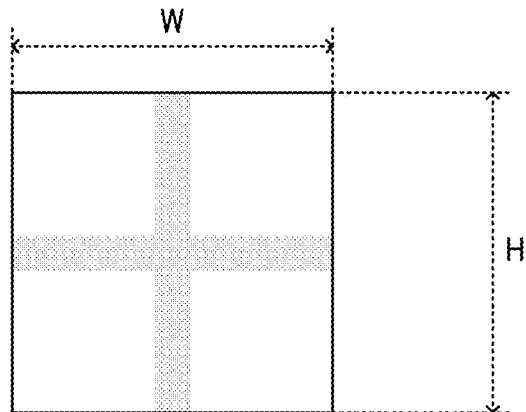
FIG. 10A is a diagram illustrating a template image according to the exemplary embodiment of the present disclosure.
Figure 10B:
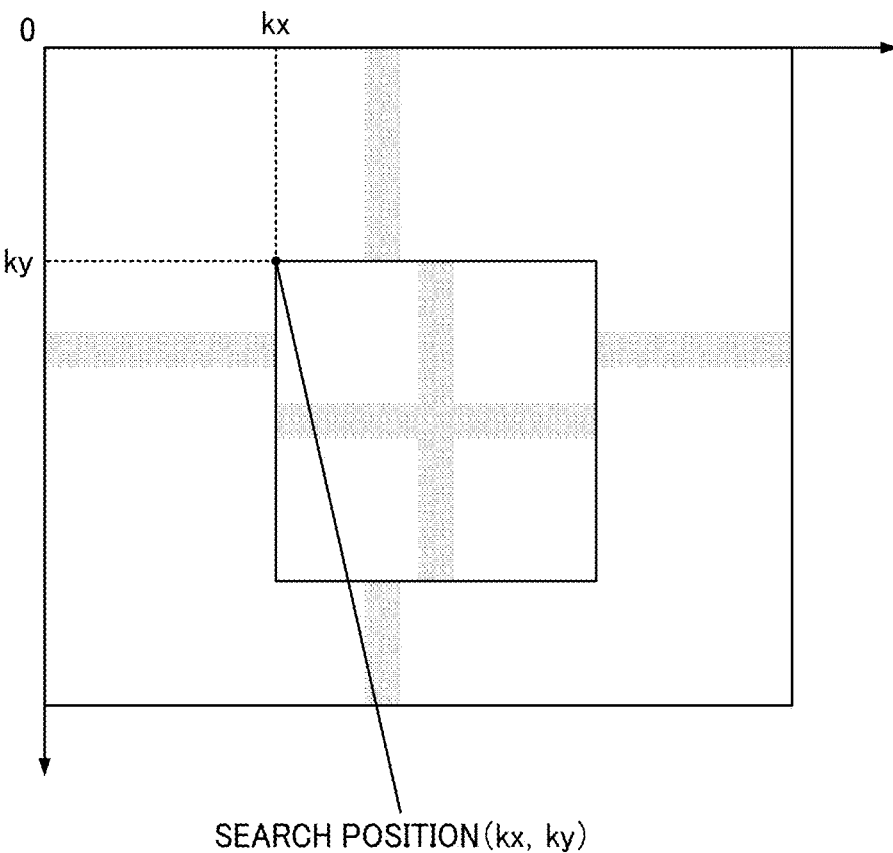
FIG. 10B is a diagram for describing processing of searching for a template image in a search range by pattern matching according to the exemplary embodiment of the present disclosure.

As an example of the template matching, a zero-mean normalized cross-correlation (ZNCC) method and a zero-mean sum of squared differences (ZSSD) method are described below with reference to FIGS. 10A and 10B. FIG. 10A is a diagram illustrating a template image according to the present embodiment. FIG. 10B is a diagram for describing processing of searching for a template image in a search range by pattern matching according to the present embodiment. The total number of pixels of the template is represented by N (=W pixels×H pixels), and a search position in the search range is represented by (kx, ky). Assuming that a luminance value at coordinates (i, j) in the template image in a case of the search position (kx, ky) being the reference coordinates (0,0) is T (i, j), and that a luminance value on an image for search is S (kx+i, ky+j), the matching score ZNCC (kx, ky) by the ZNCC method can be obtained by the following formula (1). Although the search position (kx, ky) is set at the upper left of the template image in FIG. 10B, the setting the coordinates is not limited to this, and the search position (kx, ky) may be set at the center of the template image.

Formula (1)

$$
ZNCC(kx, ky) = \cfrac{\left( N\sum_{j=0}^{h-1}\sum_{i=0}^{w-1} S(kx+i, ky+j)T(i, j) - \sum_{j=0}^{h-1}\sum_{i=0}^{w-1} S(kx+i, ky+j) \times \sum_{j=0}^{h-1}\sum_{i=0}^{w-1} T(i, j) \right)}{\sqrt{\left( N\sum_{j=0}^{h-1}\sum_{i=0}^{w-1} \{S(kx+i, ky+j)\}^2 - \left\{\sum_{j=0}^{h-1}\sum_{i=0}^{w-1} S(kx+i, ky+j)\right\}^2 \right) \times \left( N\sum_{j=0}^{h-1}\sum_{i=0}^{w-1} \{T(i, j)\}^2 - \left\{\sum_{j=0}^{h-1}\sum_{i=0}^{w-1} T(i, j)\right\}^2 \right)}} \quad (1)
$$

pression performed on an image sequence including a plurality of frames of stitched images in the spherical image format, and the image data of the corresponding still image or the moving image may be stored. The moving image compression unit 220 may perform processing of storing the moving image as image data. When the image data is stored as a still image, the still image compression block 134 compresses the image data into a still image format such as the JPEG or the TIFF. In the case of a moving image, the moving image compression block 136 compresses the moving image to a moving image format such as the MPEG-4 AVC/H.264. The generated image data is stored in a storage area of an external storage such as a memory card via the memory card slot 142.

The matching score ZNCC (kx, ky) represents a degree of similarity. In evaluating the matching score ZNCC (kx, ky) for the degree of similarity, when the matching score ZNCC (kx, ky) is 1, the matching is complete matching, and when the matching score ZNCC (kx, ky) is −1, the matching is negative-positive inversion. In other words, as the matching score of ZNCC (kx, ky) increases, the degree of similarity with the template image also increases. As illustrated in FIG. 10B, template matching is performed while the position of the template image is shifted in both of the vertical direction and the horizontal direction or one of the vertical direction and the horizontal direction within the search range, and the matching score ZNCC (kx, ky) at each search position is calculated.

In comparison, a degree of difference ZSSD (kx, ky) by the ZSSD method can be obtained by the following formula (2). In the ZSSD method, since a sum of squares of differences between luminance values of pixels at the same position is obtained, the value of ZSSD is a so-called degree of difference, and the larger the value becomes, the less the degree of similarity is, or the more the degree of difference is. Accordingly, in order to obtain a score based on the degree of similarity, a negative sign is added and −ZSSD (kx, ky) is set to a matching score.

Formula (2)

$$ZSSD(kx, ky) = \frac{\sum_{j=0}^{h-1}\sum_{i=0}^{w-1}\{S(kx+i, ky+j)\}^2}{N} -$$

$$\frac{\left\{\sum_{j=0}^{h-1}\sum_{i=0}^{w-1}S(kx+i, ky+j)\right\}^2}{N^2} + \frac{\sum_{j=0}^{h-1}\sum_{i=0}^{w-1}\{T(i, j)\}^2}{N} - \frac{\left\{\sum_{j=0}^{h-1}\sum_{i=0}^{w-1}T(i, j)\right\}^2}{N^2} -$$

$$2\left[\frac{\sum_{j=0}^{h-1}\sum_{i=0}^{w-1}S(kx+i, ky+j)T(i, j)}{N} - \frac{\sum_{j=0}^{h-1}\sum_{i=0}^{w-1}S(kx+i, ky+j)\cdot\sum_{j=0}^{h-1}\sum_{i=0}^{w-1}T(i, j)}{N^2}\right]$$

(2)

When each pixel value is 8-bit, the matching score −ZSSD (kx, ky) can take a value in a range of −(255×255) to 0. When the matching score −ZSSD (kx, ky) is 0, this means completely matched. As the matching score of ZSSD (kx, ky) increases, the degree of similarity with the template image also increases.

The above-described ZNCC method can absorb a variation in gain in the images, can absorb a variation in average brightness in the images, and has high robustness in similarity matching. In particular, the ZNCC method can be suitably applied to a case where the luminance of an image is sufficiently spread and distributed and the feature amount is large. In comparison, the ZSSD method is superior to a sum of squared differences (SSD) because the ZSSD method can absorb a variation in average brightness in the images. In addition, the ZSSD method is simpler in calculation than the ZNCC although the ZSSD method costs more in calculation than the SSD method. The ZSSD method can be suitably applied even to a blurred image having a small feature amount. The zero-mean sum of absolute differences (ZSAD) method may be used in alternative to the ZSSD method.

Problem Specific to Application in Stitching Position Detection Process

A specific application using the spherical imaging device 10 and the information terminal 170 as described above is described below. In the following description of the present embodiment, a video conference system in which participants at a plurality of sites (for example, conference rooms) perform a video conference via a network is described as an example of an application, but the application is not limited to the video conference system.

Figure 11:
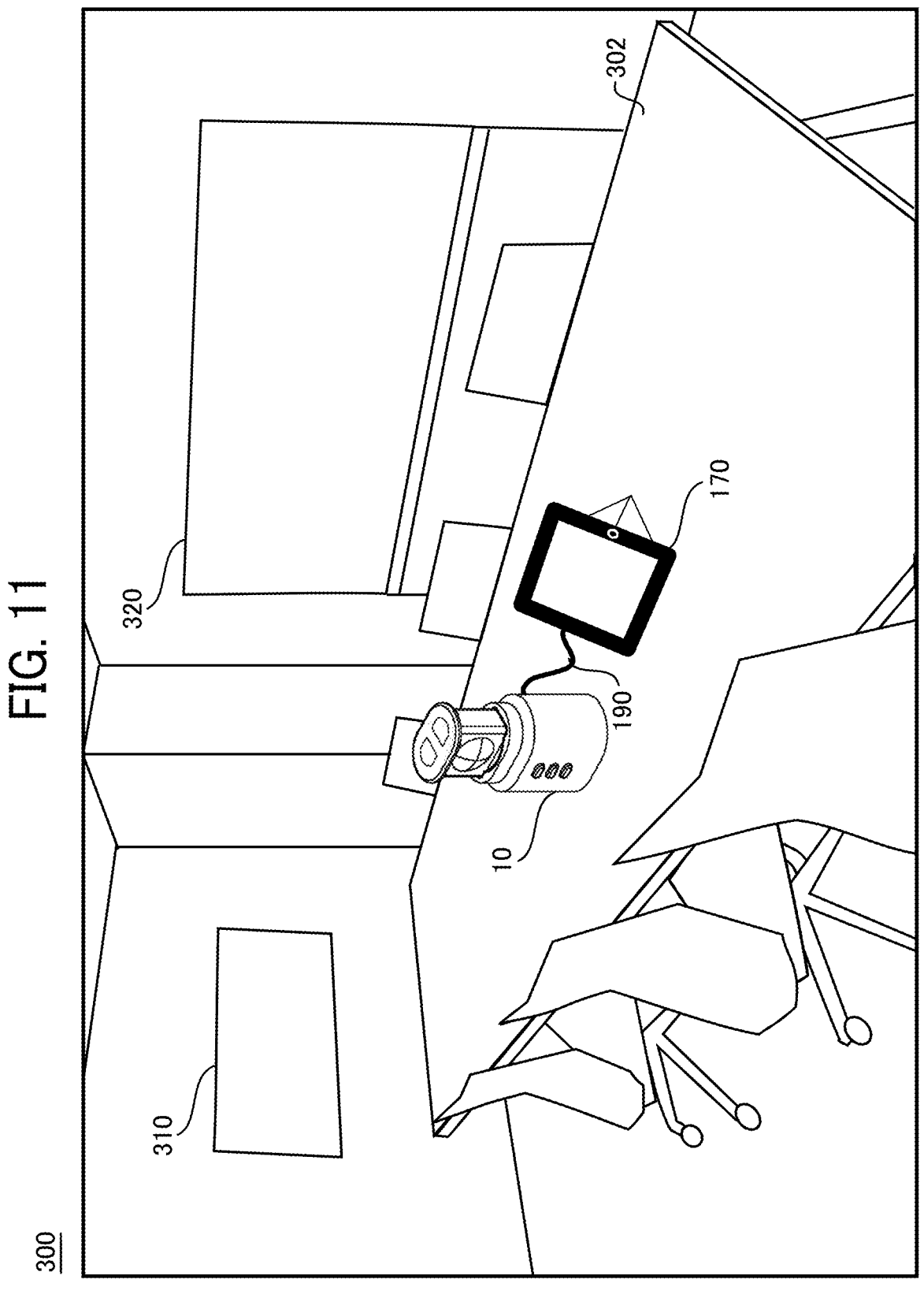
FIG. 11 is a diagram illustrating an installation state of a video conference system including the spherical imaging device and the information terminal according to the exemplary embodiment of the present disclosure.

FIG. 11 is a diagram illustrating an overview of a video conference system and an installation state of the spherical imaging device 10 and the information terminal 170 according to the present embodiment. The spherical imaging device 10 and the information terminal 170 are placed on a desk 302 in a conference room 300, which is an installation space, and are connected to each other by a USB cable 190. In the present embodiment illustrated in FIG. 11, a bottom portion (lower portion) of the spherical imaging device 10 is an installation part to place the spherical imaging device 10 on an installation surface such as a desk.

On the information terminal 170, a video conference support application is installed. The video conference support application is software that performs transmission and reception of conference video and audio and sharing of information such as materials used for a conference in real time between a plurality of sites including remote sites. As a preparation for starting a conference, the user activates the spherical imaging device 10 by pressing the operation button 18. Further, the user activates the video conference support application on the information terminal 170, and performs connection setting between the information terminal 170 and the spherical imaging device 10 on the video conference support application. When starting the conference, the user performs an operation for starting the conference from the video conference support application of the information terminal 170. When the application receives the conference start operation, the information terminal 170 connects to a network server and starts real-time streaming of the video signal of a spherical video and audio in the conference room from the spherical imaging device 10. As a result, the participants at the respective sites can acquire the video image in any of all directions in the conference room.

In the description of the present embodiment, it is assumed that the image is a panoramic image (including an image obtained by removing a part of a lower side that is normally expected to be a blind spot). However, the image is not limited to a panoramic image and may be a spherical image in an application such as conference support or video communication, for example.

In order to implement the real-time streaming as described above, image stitching for the corrected images F and R at the time of moving image streaming is desired to be performed efficiently. The spherical imaging device 10 for use in such a video conference system illustrated in FIG. 11 is designed on the assumption that the spherical imaging device is used on a desk. As described above, the bottom portion of the spherical imaging device 10 serves as an installation part, and has contact with a table or a desk when the spherical imaging device 10 is placed on a table or a desk, for example. Accordingly, the desk 302 is positioned in a lower area of a captured image, and an object such as a conference attendee or a whiteboard 320 is positioned in an upper area of the captured image.

A problem for image stitching in the above-described use situation is described below. As described above, the stitching position information is calculated by finding, or detecting, an area in one corrected image having an image that matches another image (template image) representing a predetermined area cut out from the other corrected image, by template matching. When such stitching position detection is not performed at all, stitching for an object positioned at a distance other than a fixed distance is failed to be performed or not successfully performed. In addition, in a case where the stitching position detection is performed at a single position, and the stitching processing is performed with reference to a conference attendee in the upper area, the stitching position changes according to a movement of the conference attendee, for example. This can cause a situation in which the stitching position in the video near the desk 302 reflected on the lower area is deviated. On the other hand, when the stitching position detection is performed at a plurality of positions, the above-described deviation is less likely to occur, but this can cause a decrease in processing speed or an increase in latency at the time of moving image streaming.

In the present embodiment of the disclosure, both the speed and the accuracy of the image stitching processing at the time of moving image streaming are achieved by optimizing the arrangement of the areas or portions for the above-described stitching position detection.

Setting Optimized Position Detection Area for Stitching Position Detection Process FIG. 5 also illustrates a more detailed configuration of the stitching position detection unit 206. The stitching position detection unit 206 illustrated in FIG. 5 includes a setting unit 208 and a calculation unit 210. With reference to FIGS. 5 and 12 to 19, specific processing performed by the setting unit 208 and the calculation unit 210 used in the spherical imaging device 10 according to the present embodiment of the disclosure is described in detail. The setting unit 208 and the calculation unit 210 are used in order to achieve both the speed and the accuracy of the image stitching processing during the moving image streaming.

The stitching position detection unit 206 illustrated in FIG. 5 receives inputs of the corrected image F and the corrected image R.

The setting unit 208 sets or determines a plurality of target areas in each of which a stitching position is to be obtained, in one corrected image (for example, the corrected image F), in the overlapping area that is an area overlapping with the other corrected image (for example, the corrected image R). The calculation unit 210 calculates the positions of a plurality of corresponding areas that match the plurality of target areas that are set, on the other corrected image (for example, the corrected image R). The target area refers to an area of an image from which the above-described template image is cut out in template matching, and the corresponding area is an area including an image that matches the template image or an image on which matching with the template image is attempted to be performed.

In some embodiments including the present embodiment, the number of target areas is two, and the number of corresponding areas to be compared with the target areas is also two. The two target areas, or the plurality of target areas, are arranged so as to be shifted from each other (have offsets in the positions), in a direction orthogonal to the direction in which the corrected images F and R are arranged, and set to have sizes that are different from each other. More specifically, in the case of the mapping illustrated in FIG. 9, the corrected images F and R are arranged in the horizontal direction, the plurality of target areas illustrated in FIG. 12 are arranged to be shifted from each other (have offsets in the positions) in the vertical direction, and the plurality of corresponding areas are also arranged to be shifted from each other (have offsets in the locations) in the vertical direction.

Figure 12:
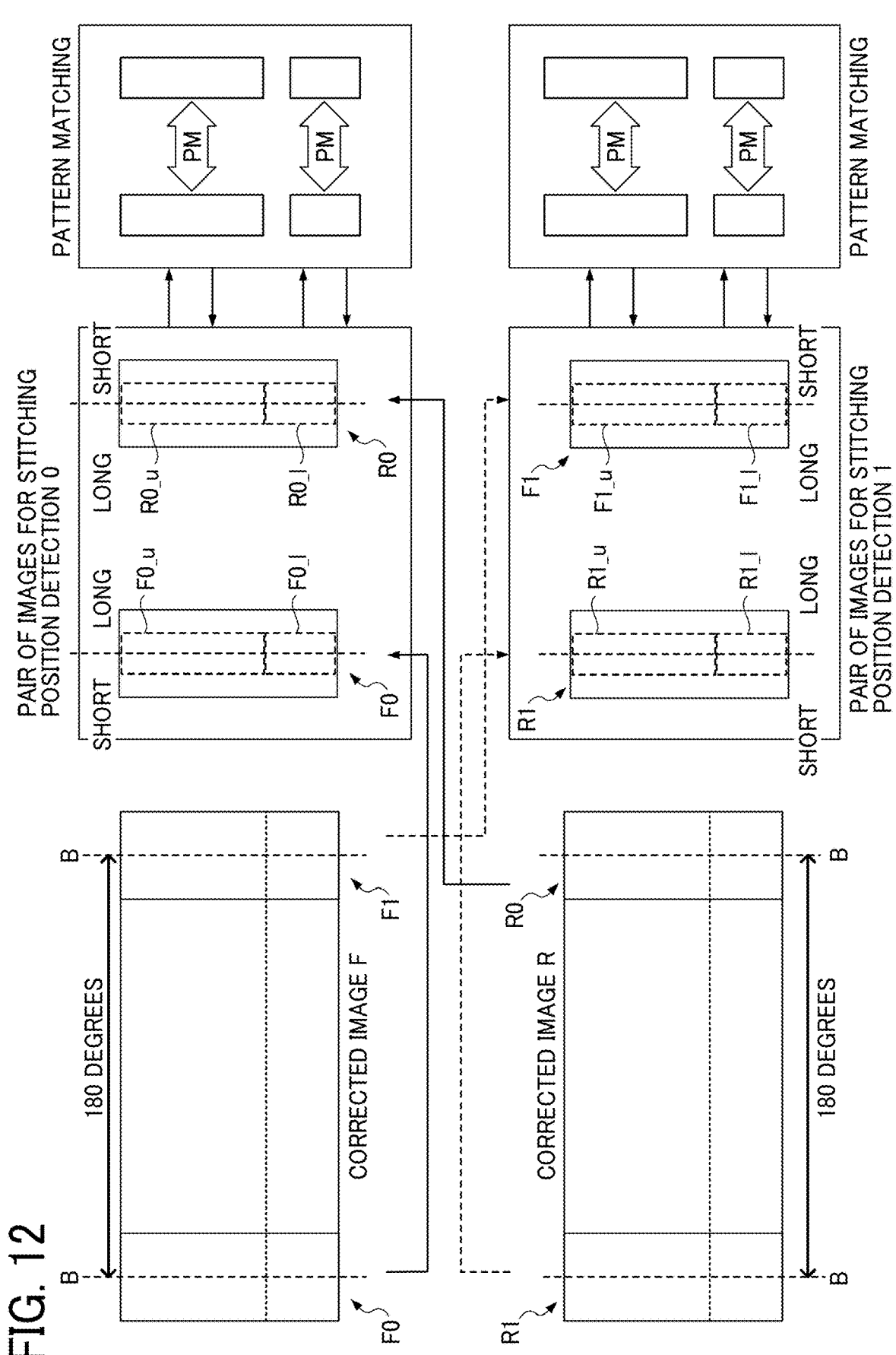
FIG. 12 is a diagram illustrating stitching detection processing according to the exemplary embodiment of the present disclosure.

FIG. 12 is a diagram illustrating stitching detection processing according to the present embodiment. The corrected image F and the corrected image R illustrated in FIG. 12 are images output from the image stitching distortion correction unit 202. Each of the corrected image F and the corrected image R includes an area of 90 degrees or more in the horizontal direction, and in the present embodiment, each of the corrected image F and the corrected image R includes an area of 180 degrees or more. Areas F0 and F1 at the left and right ends of the corrected image F and areas R0 and R1 at the left and right ends of the corrected image R are overlapping areas between the corrected images F and R, and the broken line at the center of each overlapping area is a stitching boundary B between the images. The overlapping area F0 at the left end of the corrected image F is a portion to be connected to the overlapping area R0 at the right end of the corrected image R, and the overlapping area F1 at the right end of the corrected image F is another portion to be connected to the overlapping area R1 at the left end of the corrected image R.

Calculating a stitching position for each of an overlapping-area pair <F0, R0> and an overlapping-area pair <F1, R1> can be performed independently. Regarding the overlapping-area pair <F0, R0>, first, the overlapping area F0 is cut out from the corrected image F and the overlapping area R0 is cut out from the corrected image R, to be a pair of images for stitching position detection. In the overlapping areas F0 and R0, two target areas F0_*u* and F0_*l* and two corresponding areas R0_*u* and R0_*l* corresponding to the two target areas are set. Each of the target areas F0_*u* and F0_*l* is an area in which a stitching position is to be detected. The positions of the areas F0_*u*, F0_*l*, R0_*u*, and R0_*l* are temporary positions at which matching is attempted to be performed.

Figure 13:
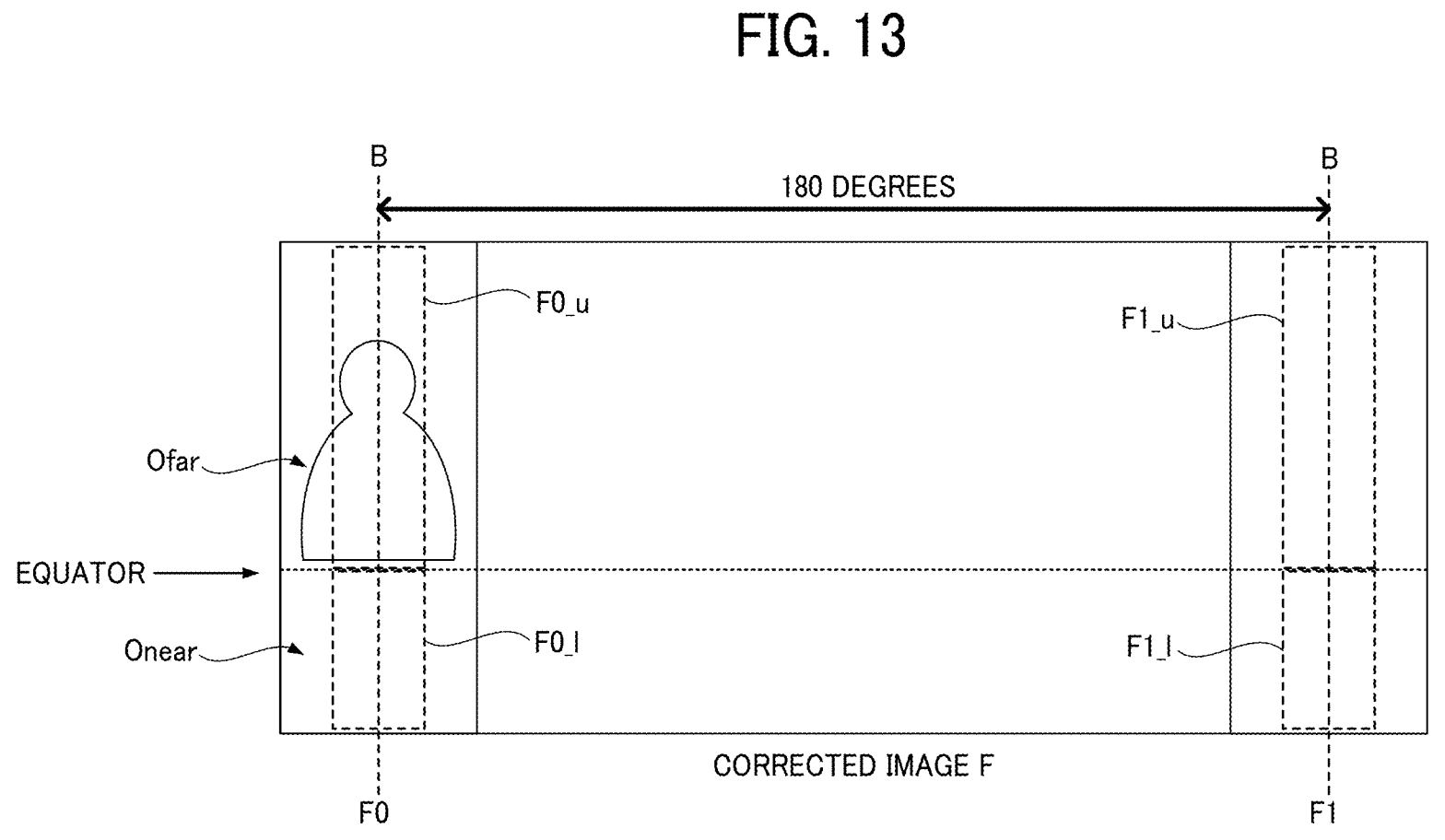

FIG. 13 is a diagram for describing a typical placement of objects Onear and Ofar on a screen in the use situation of the video conference illustrated in FIG. 11. In such a use situation in which the spherical imaging device 10 is placed on a desk as illustrated in FIG. 11, the object Onear in a short distance from the spherical imaging device 10 has a tendency to be positioned in a small area on a lower part of the screen, and the object Ofar in a long distance (or a medium distance) from the spherical imaging device 10 has a tendency to be positioned on an upper part of the screen as illustrated in FIG. 13. In such a situation, it is preferable that the size of an area in which a stitching position is to be detected is greater in an upper part than a lower part in the vertical direction, namely, the relations of F0_*u*>F0_*l* and R0_*u*>R0_*l* are satisfied. The size in the horizontal direction (width) may be the same. In such a situation, the target area F0_*u* corresponds to an area of long distance in which the distance to an object is (tends to be) relatively long, and the target area F0_*l* corresponds to an area of short distance in which the distance to an object is (tends to be) relatively short.

The two areas are arranged with the equator as a boundary, in the vertical direction. In this case, the areas arranged in the vertical direction (for example, F0_*u* and F0_*l*) are preferably arranged so as to have gaps (margins) from the equator. For example, the areas may be arranged in a manner that each area has the gap (margin) of about 3% to 10% of the size of the image in the vertical direction. In addition, the size of each area in the vertical direction may be a size corresponding to the entire remaining area or a size corresponding to a part of the remaining area, and in this case, the sizes of the upper area and the lower area may be different from each other. For example, the size in the vertical direction of the upper area (for example, $F0\_u$) may be from a position shifted upward from the equator by 3% to 10% of the size of the image in the vertical direction to the upper limit (upper end), namely, 90% to 97% of the size from the equator to the upper end in the vertical direction. For example, the size in the vertical direction of the lower area (for example, $F0\_l$) may be from a position shifted downward from the equator by 3% to 10% of the size of the image to in the vertical direction to the lower limit (lower end), namely 90% to 97% of the size from the equator to the lower end in the vertical direction. In addition, for example, the size in the horizontal direction may be set to 30% to 70% of the overlapping area.

By arranging the areas (the target areas and the corresponding areas) as illustrated in FIGS. 12 and 13, stitching for each of the objects captured from different distances can be performed accurately with a minimum number of areas for each object. In addition, even if an object in a short distance is positioned on an upper part of the screen and an object in a long distance is positioned on a lower part of the screen, the processing is performed independently, and thus the stitching position can be detected appropriately.

Further, in the example of FIG. 13, there are the two target areas and the two corresponding areas, and the two target areas and the two corresponding areas are arranged with the equator as a boundary, in the vertical direction. When two target areas and two corresponding areas are arranged, such an arrangement as described above is suitable. In the spherical image format, the equator is typically located at the center in the vertical direction. In the present embodiment, the spherical imaging device 10 for video conference is used and is placed on a table top with the bottom portion of the spherical imaging device 10 in contact. Since the bottom portion is not a significant portion, a lower portion of all vertical pixels of the spherical image format is missing in the present embodiment. As a result, the equator is located slightly lower than the center.

Figure 14:
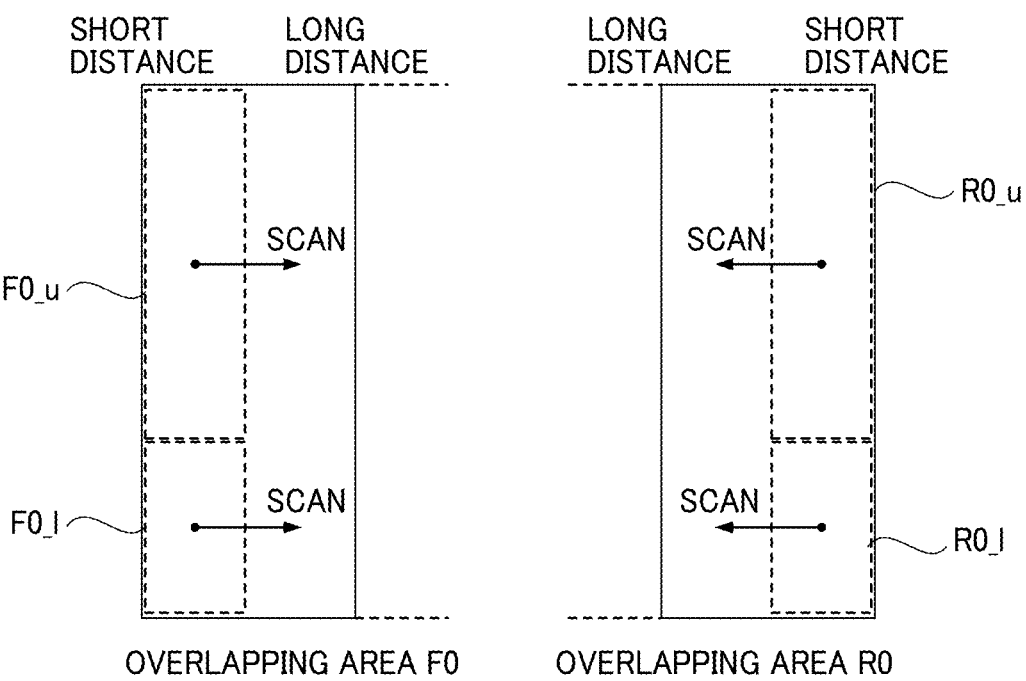
FIG. 14 is a diagram for describing scanning for a target area for generating a template image and a corresponding area for generating a comparison image in stitching position detection according to the exemplary embodiment of the present disclosure.

FIG. 14 is a diagram for describing a method of scanning for a target area for generating a template and a corresponding area image for generating a comparison image in the stitching position detection according to the present embodiment. With reference to FIG. 14, a method of template matching for detecting a stitching position in the present embodiment is described. The description is given by using the overlapping-area pair <F0, R0>. As illustrated in FIG. 14, first, in the overlapping area F0 of the corrected image F, which is one of the pair, a position of the upper target area $F0\_u$ for stitching position detection is set to the shortest distance, and the upper target area $F0\_u$, which is set, is used as a template image. Subsequently, in the overlapping area R0 of the corrected image R, which is the other one of the pair, the corresponding area $R0\_u$ for stitching position detection is set to the shortest distance.

The short distance and the long distance in the corrected image are described below. In stitching images, as an object distance around the boundary is longer, the object moves from the periphery to the center in the partial image illustrated in FIG. 8B. When the mapping illustrated in FIG. 9 is performed, as the object distance increases, the object moves toward the left center or the right center in the spherical image illustrated in FIG. 9. The short distance refers to a direction to shift in the corrected image when the object distance becomes short, and the long distance refers to a direction to shift in the corrected image when the object distance becomes long.

Subsequently, an image matching score is calculated for the target area $F0\_u$ and the corresponding area $R0\_u$, which are the upper areas. A search range of the corresponding area $R0\_u$ is set to be up to the edge of the long distance of the overlapping area R0. The image matching score for the target area $R0\_u$ and the corresponding area $F0\_u$, which are the upper areas, is calculated each time the corresponding area $R0\_u$ is horizontally shifted to the long distance by a predetermined pixel unit (for example, one pixel).

After the corresponding area $R0\_u$ reaches the edge of the long distance, the target area $F0\_u$ on the template is horizontally shifted by a predetermined pixel unit (for example, one pixel) to the long distance and is set to a new template image. Then, similarly, the matching score is calculated while scanning for the corresponding area $R0\_u$ is performed from the short distance to the long distance. This operation is repeated until the target area $F0\_u$ reaches the long distance.

Based on a set of matching scores obtained in the above-described process, with respect to the coordinates of the stitching boundary as the reference position, a position of the template image at the time when the score for evaluating the degree of matching is maximum is stored as an offset amount of the target area $F0\_u$, and a position for search is stored as an offset amount of the corresponding area $R0\_u$.

Although the combination of the target area $F0\_u$ and the corresponding area $R0\_u$, which are the upper areas, has been described above, the substantially same process is performed for the combination of the target area $F0\_l$ and the corresponding area $R0\_l$ that are the lower areas. This completes the stitching detection processing for the overlapping-area pair <F0, R0>. After the processing for one overlapping-area pair is completed, the substantially same processing is performed for the other overlapping-area pair <F1, R1>, the stitching position detection process is performed for the combination of $R1\_u$ and $F1\_u$ and the combination of $R1\_l$ and $F1\_l$, and each position at which the score is maximum is stored as the offset amount.

Although scanning for the template image is performed in the horizontal direction in the present embodiment described above, the scanning for the template image may be performed in both the vertical direction and the horizontal direction as described with reference to FIGS. 10A and 10B. In the present embodiment described above, the template image is cut out from the corrected image F. However, the template image may be cut out from the corrected image R, the relationship between the overlapping images in the pair may be switched in relation to the processing, or the upper area and the lower area may be switched in relation to the processing.

Figure 15:
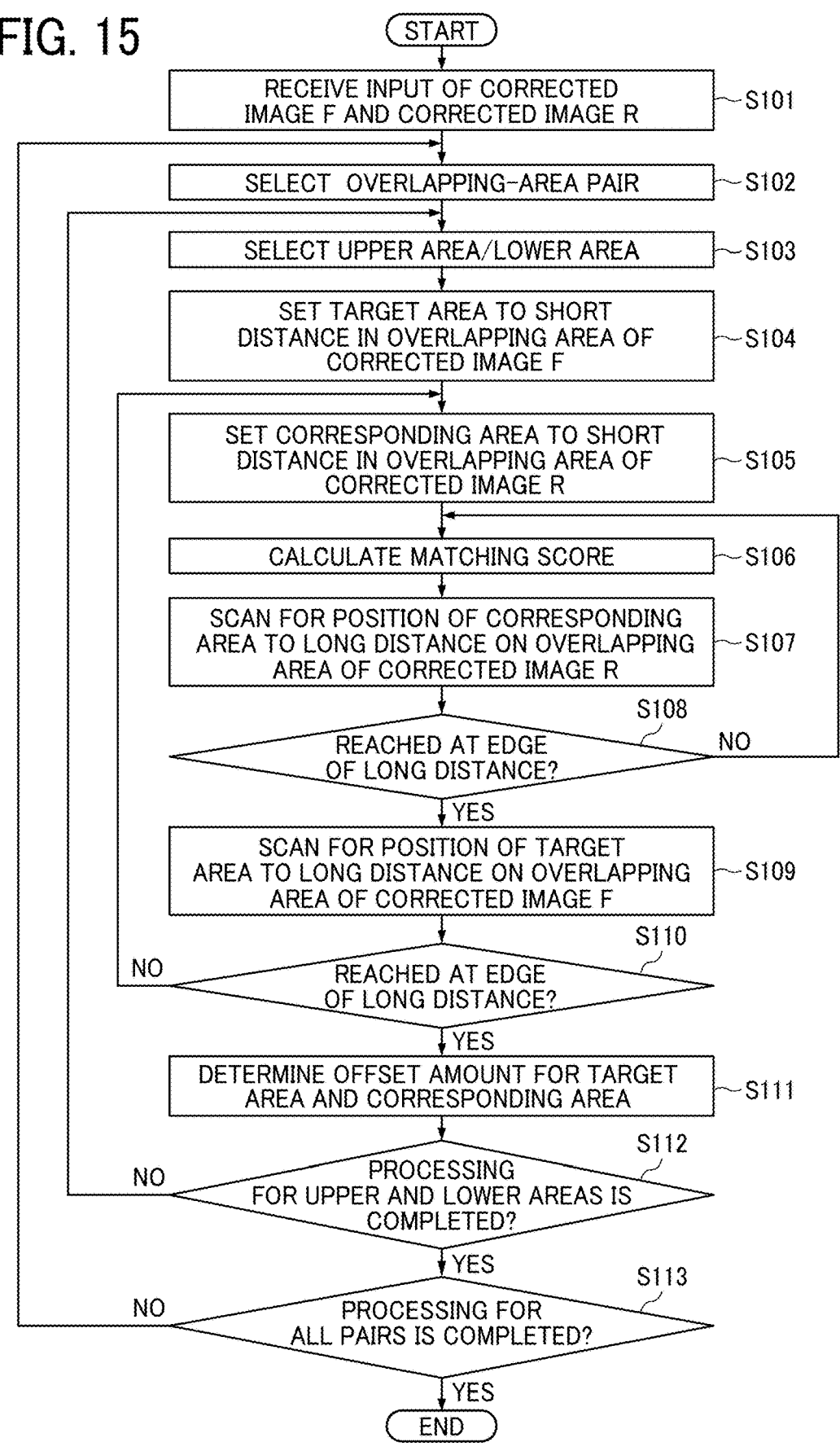
FIG. 15 is a flowchart of a stitching position detection process performed by the spherical imaging device according to the exemplary embodiment of the present disclosure.

FIG. 15 is a flowchart of a stitching position detection process performed by the spherical imaging device 10 according to the present embodiment. The process illustrated in FIG. 15 starts from Step S100 for each frame of a moving image at the time of capturing the moving image.

In Step S101, the stitching position detection unit 206 receives the corrected image F and the corrected image R, which are output from the image stitching distortion correction unit 202, for a frame to be processed. In Step S102, the stitching position detection unit 206 selects an overlapping-area pair to be processed, namely selects one of the overlapping-area pair <F0, R0> and the overlapping-area pair <F1, R1>. This selection is repeated as many times as the number of pairs (two in the present embodiment), and the pairs are selected in any order. In Step S103, the stitching position detection unit 206 selects one of the upper area and the lower area. This selection is repeated as many times as the number of areas (two in the present embodiment). The upper area and the lower area are selected in any order.

In Step S104, the setting unit 208 sets a target area (the upper area or the lower area in accordance with the selection of Step S103), in which the stitching position is to be obtained, to the short distance in the overlapping area (F0/F1 in accordance with the selection of Step S102) of the corrected image F. The overlapping area is an area overlapping with a part of the corrected image R. In Step S105, the setting unit 208 further sets the corresponding area (the upper area or the lower area according to the selection of Step S103) to the short distance in the overlapping area (R0/R1 according to the selection of Step S102) of the corrected image R. In Step S106, the calculation unit 210 calculates a matching score between a template image cut out from the target area (upper area or lower area) of the overlapping area (F0/F1) of the corrected image F and a comparison image cut out from the target area (upper area or lower area) of the overlapping area (R0/R1) of the corrected image R.

In Step S107, the setting unit 208 scans for the position of the corresponding area (R0_u/R0_l/R1_u/R1_l) to the long distance on the overlapping area (R0/R1) of the corrected image R. The movement may be performed by one pixel unit, or may be performed by two or more pixels. In step S108, the setting unit 208 determines whether or not the movement is crossed, or exceeds, the edge of the long distance of the overlapping area (R0/R1), which is the edge of the search range of the corresponding area. In other words, the setting unit 208 determines whether the movement has reached at the edge of the long distance or not. In a case where the range of the corresponding area crosses the edge of the long distance as a result of the movement after the score calculation, the setting unit 208 determines that the position at which the score calculation is performed has been already at the edge of the long distance. When the determination in Step S108 indicates that the edge of the long distance has not yet been exceeded (NO), the process returns to Step S106. In this case, the matching score is calculated again at the position after the movement. On the other hand, when the determination in Step S108 indicates that the edge of the long distance has been exceeded (YES), the process proceeds to Step S109.

In Step S109, the setting unit 208 scans for the position of the target area (F0_u/F0_l/F1_u/F1_l) to the long distance on the overlapping area (F0/F1) of the corrected image F. The movement may be performed by one pixel unit, or may be performed by two or more pixels. In Step S110, the setting unit 208 determines whether as a result of the movement, the range of the corresponding area crosses, or exceeds, the edge of the long distance of the overlapping area (F0/F1) which is the end of the setting range of the target area. When the determination in Step S110 indicates that the edge of the long distance has not yet been exceeded (NO), the process returns to Step S105. In this case, the target area is moved to the long distance, but the corresponding area in the overlapping area (R0, R1) on the corrected image R is moved back to the position in the short distance. On the other hand, when the determination in Step S110 indicates that the edge of the long distance has been exceeded (YES), the process proceeds to Step S111.

In Step S111, the calculation unit 210 calculates, as an offset amount, the position of the target area on the corrected image F and the position of the corresponding area on the corrected image R indicating the maximum score, based on the set of the matching scores calculated so far.

In Step S112, whether the processing for both the upper area and the lower area has been completed for the overlapping-area pair to be processed is determined. When the determination in Step S112 indicates that the processing for both has not yet been completed (NO), the process returns to Step S103. In this case, an area different from the previous area is selected. On the other hand, when the determination in Step S112 indicates that the processing has been completed for both (YES), the process proceeds to Step S113.

In Step S113, whether the processing of all the overlapping-area pairs has been completed is determined.

When the determination in Step S113 indicates that the processing for all the pairs has not been completed (NO), the process returns to Step S102. In this case, an overlapping-area pair different from the previous pair is selected. On the other hand, when the determination in Step S113 indicates that the processing has been completed for all the pairs (YES), the process proceeds to Step S114 and the process ends. After that, the next frame is to be processed.

FIG. 16 is a diagram illustrating a data structure of a stitching position table including information on a stitching position for each pixel to correct the image stitching conversion table 232, according to the present embodiment. As illustrated in FIG. 16, the stitching position detection unit 206 generates a table that holds information in which the offset amount ($\Delta\theta$) is associated with the corresponding converted coordinate value ($\theta$) for all coordinate values. In the present embodiment, the stitching position table is generated for both corrected images.

An offset amount ($\Delta\theta i$) (i is an index for identifying F0_u, F0_l, F1_u, or F1_l) for each area obtained by the stitching position detection is set to the coordinate values of the area, and the offset amount ($\Delta\theta$) corresponding to each coordinate value ($\theta$) is interpolated to calculate a stitching position that is a remaining position. In the present embodiment, the stitching position for each pixel is stored in a table format, but the disclosure is not limited to this.

Figure 17A:
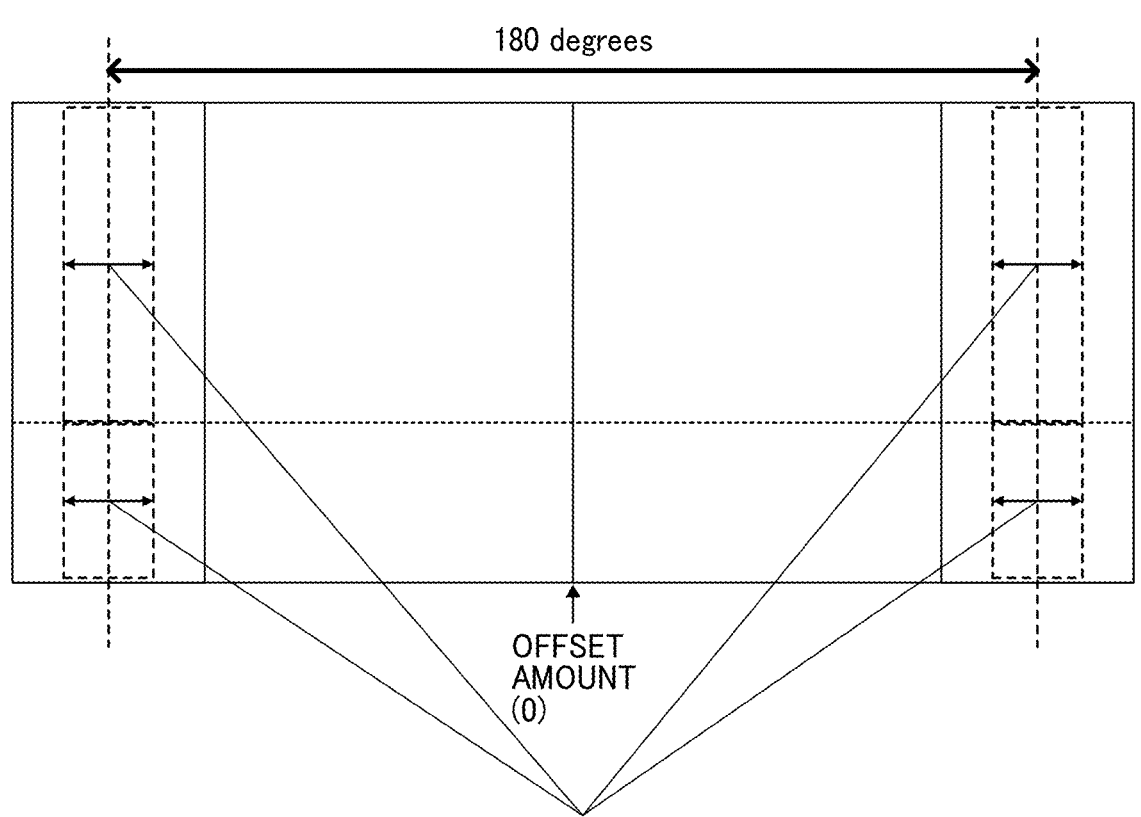
FIGS. 17A and 17B are diagrams for describing processing of generating the stitching position table for correcting the conversion table, according to the exemplary embodiment of the present disclosure.
Figure 17B:
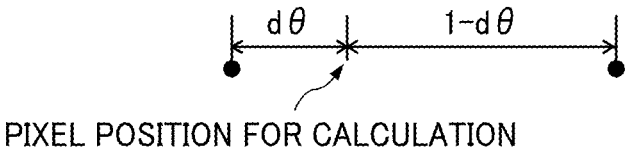

Regarding generating the stitching position table, more specifically, as illustrated in FIG. 17A, the offset amount ($\Delta\theta i$) is set to each area for detecting a stitching position. At the center coordinate of the horizontal coordinate $\theta$, the offset amount is set to 0. As illustrated in FIG. 17B, other coordinates for which the offset amount is not set are calculated by linear interpolation calculation based on the set two points (the center coordinates and the coordinates of the center of the area). When the upper area and the lower area (for example, F0_u and F0_l) are each provided with a gap of about 3 to 10% with respect to the equator as described above, the offset amount of the area between the upper area and the lower area can be obtained by interpolation of the offset amount of the upper area (for example, F0_u) and the offset amount of the lower area (for example, F0_l) that are obtained by linear interpolation between two points in the $\theta$ direction set in advance. The offset amount may be limited when the offset amount exceeds a predetermined threshold for the upper area and the lower area. For example, the offset amount of the lower area may be limited to be within a predetermined percentage of the offset amount of the upper area.

The table correction unit 212 updates the image stitching conversion table 232 using the stitching position table as illustrated in FIG. 16 obtained in the way as described above. For the first frame and several frames subsequent to the first frame, the table correction unit 212 outputs the distortion correction conversion table 230 as the image stitching conversion table 232. On the other hand, for frames after a predetermined number of frames, the image stitching conversion table 232 that is updated is used. Regarding updating the image stitching conversion table 232, the table correction unit 212 detects a stitching position based on the corrected images F and R generated using the previous image stitching conversion table 232, and corrects the previous image stitching conversion table 232 using a stitching position detection result by the stitching position detection unit 206.

Figures 18A, 18B, 18C, 18D:
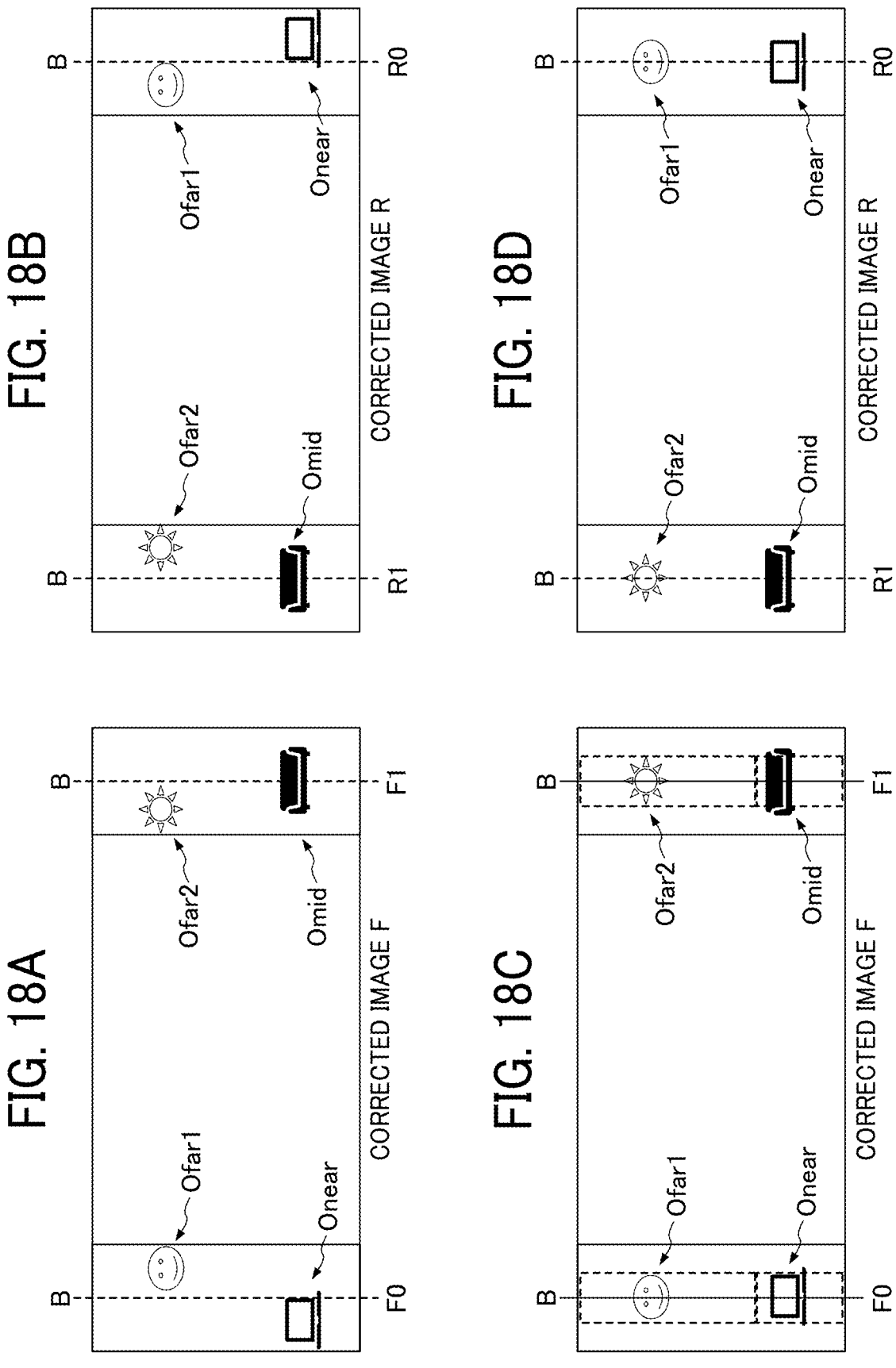
FIGS. 18A to 18D are diagrams for describing processing of image stitching performed after conversion, according to the exemplary embodiment of the present disclosure.

FIGS. 18A to 18D and 19 are diagrams for describing processing of image stitching performed after conversion according to the present embodiment. The image stitching distortion correction unit 202 performs distortion correction on the partial image F and the partial image R using the image stitching conversion table 232 that is updated based on the stitching position information and the image stitching conversion table 232 that is used last time, and generates the corrected image F and the corrected image R. FIGS. 18A and 18B are diagrams illustrating the corrected image F and the corrected image R, respectively, in a state of a pre-processed frame (in a state in which the stitching position is not corrected). FIGS. 18C and 18D are diagrams illustrating the corrected images F and R, respectively, that are obtained by calculating the stitching positions using the corrected images F and R in the state of the pre-processed frames illustrated in FIGS. 18A and 18B as inputs and performing correction using the image stitching conversion table 232 generated based on the stitching positions.

As illustrated in FIGS. 18A and 18B, in the pre-processed frame, objects Ofar1 and Ofar2 each of which is supposed to be positioned on the stitching boundary B, but actually positioned in a long distance, are positioned closer to the center, namely positioned at a distance longer than that of the stitching boundary B, an object Omid that is positioned in a medium distance is actually positioned substantially on the stitching boundary B, and an object Onear that is positioned in a short distance is positioned closer to the periphery, namely positioned at a distance shorter than that of the stitching boundary B. Compared to this, in the image that is corrected by calculating the stitching position and using the image stitching conversion table 232 generated based on the calculated stitching position, as illustrated in FIGS. 18C and 18D, each position of the objects Ofar1, Ofar2, Omid, and Onear is corrected to be on the stitching boundary B that is the position where each of the objects supposed to be.

Figure 19:
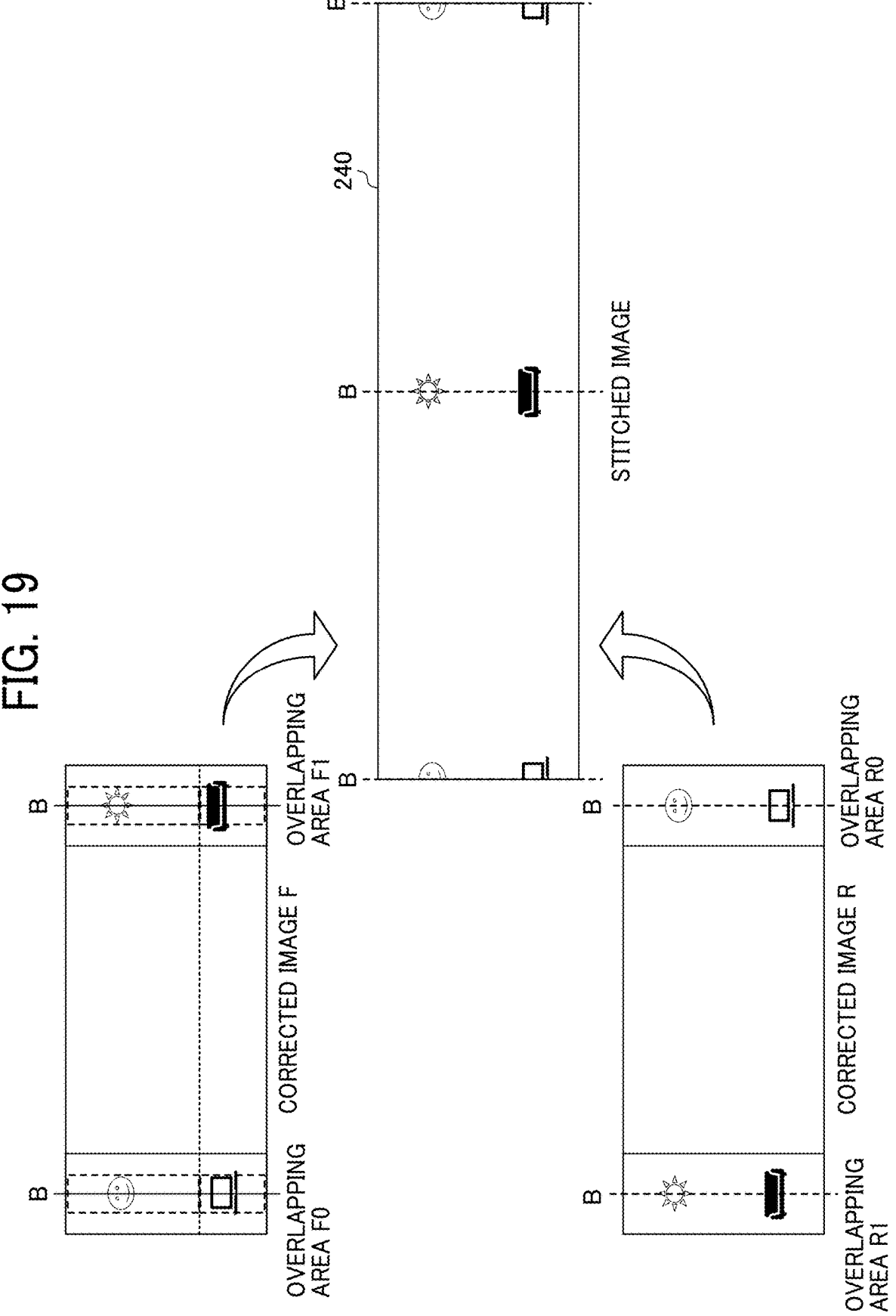
FIG. 19 is a diagram describing processing of image stitching after conversion, according to the exemplary embodiment of the present disclosure.

Subsequently, as illustrated in FIG. 19, the image stitching unit 204 stitches, or combines, the corrected image F and the corrected image R on which the stitching position has been reflected to generate the stitched image 240. The outside of the joint boundary B of the corrected images F and R illustrated on the left of FIG. 19 is cut out, and the images corresponding to 180 degrees are arranged side by side horizontally to be output as a stitched image. For convenience of explanation, the outside of the stitching boundary B is cut out, and this is preferable from the viewpoint of increasing the processing speed. However, in some embodiments, blending processing may be performed for the overlapping area, so that images of the overlapping area are smoothly superimposed with transparency (a value) based on position.

The stitched image sequence including the composite frames that is the generated stitched images, is sequentially output to the moving image compression unit 220, further subjected to moving image compression by the moving image compression unit 220, and written out as moving image data.

As described above, according to the above-described embodiment, an image processing apparatus, an image processing system, an imaging apparatus, an image processing method, and a program can combine, or stitch, images according to an object distance while achieving both accuracy and speed in combining, or stitching, a plurality of images having an overlapping area. This is preferable for combining a plurality of images with parallax captured by a plurality of wide-angle lenses or fisheye lenses.

In the above-described embodiment, the plurality of target areas and the plurality of corresponding areas are arranged at different positions in the orthogonal direction to the direction in which the plurality of corrected images F and R are arranged, and are set to have different sizes. As described above, by minimizing with respect to the arrangement and the size of the areas (the target areas and the corresponding areas) on which the stitching detection is performed, high-speed and high-accuracy image stitching can be performed. Such processing is particularly suitable for real-time processing such as real-time streaming. As described above, by using the characteristic of having bias in the distance of an object captured in a plurality of target (correspondence) areas, processing is optimized by making the size of an area in which an object at a relatively short distance tends to be captured and the size of an area in which an object at a relatively long distance tends to be captured different from each other.

In particular, in an embodiment, two target areas and two corresponding areas are set, and one of the areas having a size smaller than the other one is a part (for example, a lower portion in the use situation illustrated in FIG. 11) where an object at a distance shorter than the other one tends to be located. More preferably, the two target areas and the two corresponding areas are arranged in the vertical direction with respect to the equator. By reducing an area in which an object in a relatively short distance tends to be captured, image stitching can achieve high efficiency and high accuracy. Such an arrangement is an optimum arrangement particularly in such a use situation in which the spherical imaging device 10 is arranged on a desk, and an optimum solution particularly in a case where both speed and quality are desired, such as real-time moving image streaming.

In addition, in some embodiments, the image stitching conversion table 232 updated using the previous image stitching conversion table 232, which is used last time, and the stitching position detection result by the stitching position detection unit 206 is used. Accordingly, the stitching position can be adaptively changed with an inexpensive system.

In the above-described embodiment, the two target areas are set in the vertical direction with respect to one image of each overlapping-area pair. However, the number of target areas arranged in the vertical direction is not limited to two. In some embodiments, three target areas may be set in the vertical direction. For example, three target areas may be set by gradually increasing the size of the target area in the order of the short distance (lower of the image), the middle distance (center of the image), and the long distance (upper of the image) (the size for the short distance<the size for the middle distance<the size for the long distance). Alternatively, the target areas of the middle distance and the long distance may be set to have the same size that is greater than that of the short distance (the size for the short distance<the size for the middle distance=the size of the long distance).

As described above, more than two target areas can be set as long as the speed of the image stitching for the spherical imaging device 10, namely, conditions such as the frame rate and the latency in the case of streaming the moving image in real time are achieved.

In addition, which of the target areas is increased in size may be appropriately changed depending on the installation situation of the spherical imaging device 10. In addition, in the above-described embodiment, the target area where an object in a long distance tends to be placed is set to be larger than the other target area, but in some embodiments, the target area in the short distance may be set to be larger than the one or more other target areas.

In the above-described embodiment, the spherical imaging device 10 includes the image processing apparatus, the image processing system, or the imaging apparatus according to the present embodiment. However, the configurations of the image processing apparatus, the image processing system, and the imaging apparatus are not limited to the above-described configurations. For example, in some embodiments, image processing other than the above-described imaging processing for the partial image may be distributed and implemented on the information terminal 170 or another image processing apparatus (for example, a personal computer, a server, or a virtual computer on a cloud). In other words, the imaging apparatus having the function of image capturing and the image processing apparatus having the function of image processing may be separately provided. In such an embodiment, the spherical imaging device 10 acquires and outputs a plurality of partial images, and the information terminal 170 or another image processing apparatus receives input of the plurality of partial images output from the spherical imaging device 10, performs stitching detection and image stitching processing, generates an output image, displays a monitor image, and stores image data, for example.

In the above-described embodiment, the corrected image F and the corrected image R are images captured by the two solid-state imaging elements 22A and 22B, respectively, of the imaging device integrated with the image processing apparatus (for example, a controller) having a function of performing image processing. The two solid-state imaging elements 22A and 22B capture the images in directions (opposite directions) different from each other by 180 degrees in the horizontal plane in a manner that the fields of view partially overlap each other in the horizontal plane. In other words, the two solid-state imaging elements 22A and 22B are configured to capture a field of view of one round in the horizontal direction. In addition, the spherical imaging device 10 is provided with the installation part at the lower portion thereof, and the direction in which the corrected image F and the corrected image R are arranged in the image stitching is the horizontal direction (left-right direction) in the spherical image, and the orthogonal direction is the up-down direction. However, the above-described configurations are merely examples, and the disclosure is not limited to the above-described configurations. For example, when the spherical imaging device 10 is attached to a wall in a horizontal direction and images are captured in a vertical direction, corrected images are arranged in the vertical direction at the time of image stitching, and the orthogonal direction is the horizontal direction.

For example, in some embodiments, the installation part may be provided on the upper portion of the spherical imaging device 10, and the spherical imaging device 10 may be suspended from a ceiling. In this case, sizes of a target area and a corresponding area may be reversed. In some embodiments, three or more solid-state imaging elements 22 may be provided by being arranged in a horizontal plane. In such a case, the number of overlapping-area pairs corresponds to the number of connections. For example, the number of overlapping area pairs may be three in an imaging apparatus including three lenses and configured to capture images in directions different from each other by 120 degrees in the horizontal plane and to capture a field of view of one round in the horizontal direction so that the field of view having an overlapping part in the horizontal plane (for example, with an angle of view of 120 degrees+an overlapping portion included in the field of view). Further, in addition to the solid-state imaging elements arranged in the horizontal direction described above, an additional imaging element arranged to face in a direction other than the horizontal direction (for example, directly above) may be provided. In this case, the above-described stitching detection processing may be applied to image stitching performed on a plurality of images corresponding to the plurality of solid-state imaging elements arranged in the horizontal direction. In addition, the spherical imaging device 10 may capture a field of view of less than one round (for example, 270 degrees) in the horizontal direction. In this case, the overlapping-area pair may be one.

Further, in some embodiments, the corrected image F and the corrected image R may be images captured by a plurality of solid-state imaging elements that capture images in directions different from each other in the vertical direction. In addition, the corrected image F and the corrected image R may be the images that have fields of view partially overlapping each other in the vertical direction. In addition, the plurality of solid-state imaging elements may capture an entire field of view in the vertical direction, which is, for example, in a case that the plurality of solid-state imaging element faces in the vertical direction in alternative to the left-right direction or the front-rear direction. In this case, the spherical imaging device 10 may be installed on a wall by an installation part provided on a side portion of the spherical imaging device 10, and the direction in which the corrected image F and the corrected image R are arranged at the time of image stitching may be the vertical direction in a spherical image and the orthogonal direction may be the horizontal direction. Further, the spherical imaging device 10 may capture a field of view of less than one round in the vertical direction. In this case, the overlapping-area pair may be one.

Figure 20:
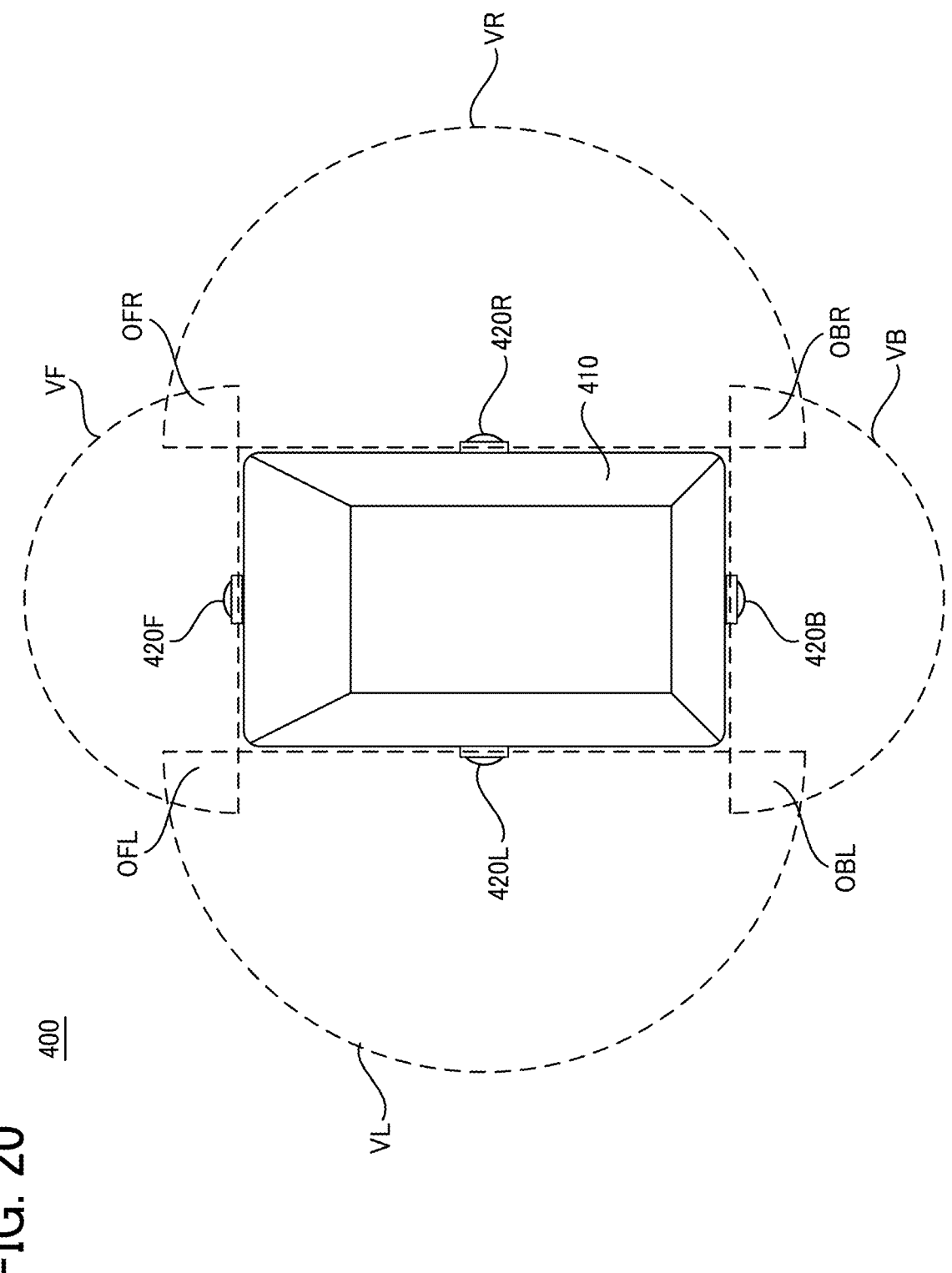
FIG. 20 is a schematic diagram illustrating a vehicle that is a mobile apparatus including four imaging bodies according to another embodiment of the disclosure.

In some embodiments, the image processing apparatus, the image processing system, and the imaging apparatus described in the above-described embodiments may be included in a mobile apparatus. The mobile apparatus includes a vehicle, an aircraft, a ship, and a mobile robot. FIG. 20 is a schematic diagram illustrating a vehicle 410 that is a mobile apparatus including four imaging bodies 420F, 420B, 420L, and 420R according to an embodiment. The four imaging bodies are an example, and more than four imaging bodies may be provided.

The imaging body 420F captures an image of the front of the vehicle 410, the imaging body 420B captures an image of the rear of the vehicle 410, the imaging body 420L captures an image of the left of the vehicle 410, and the imaging body 420R captures an image of the right of the vehicle 410. For example, the imaging body 420F is arranged at a position relatively close to the ground in the vehicle height direction, such as near a front grille or a front bumper of the vehicle, and the imaging bodies 420B, 420L, and 420R are arranged at a position having a height substantially same as that of the imaging body 420F. In FIG. 20, imaging ranges captured by the imaging bodies 420F, 420B, 420L, and 420R are indicated by broken lines VF, VB, VL, and VR, respectively. As illustrated in FIG. 20, there are overlapping areas OFR, OBR, OBL, and OFL in which imaging ranges of adjacent imaging bodies (for example, 420F and 420R, 420R and 420B, 420B and 420L, and 420L and 420F) overlap each other. With this configuration, four images captured by the imaging bodies 420F, 420B, 420L, and 420R in all direction around the vehicle can be acquired. Then, by performing image stitching processing on the captured four images based on the overlapping areas OFR, OBR, OBL, and OFL, a panoramic image representing one round in the horizontal direction (the entire circumference of the vehicle) can be generated.

At this time, the processing in relation to the target area and the corresponding area where the connection position is detected, which is described in the above-described embodiment, can be applied. Then, the generated panoramic image, or a panoramic moving image based on the panoramic image is displayed on a display device such as a car navigation system included in the vehicle, so that the driver can easily grasp the situation around the own vehicle.

In the present embodiment, a road surface such as asphalt is positioned in a lower area of the captured image, and a main object such as another vehicle or a pedestrian that may be present around the vehicle is positioned in an upper area of the captured image. In applying an embodiment of the disclosure to the vehicle 410, the video displayed on the display device is desired to have a real-time property, and it is not preferable that the image processing speed is low even though the accuracy of the stitching processing is high. In addition, even if the image processing speed is high, if the stitching processing is performed with low accuracy, a video in which a shift in a stitching position occurs due to a change in the position of the main object located on the upper portion of the image is displayed, and this may cause the driver to feel discomfort. Accordingly, according to the present embodiment, similarly to the other embodiments, both the speed and the accuracy of the image stitching processing at the time of moving image streaming can be achieved.

In an image stitching technology according to a related art, images are stitched according to an object distance, so that the images can be stitched with high accuracy. However, stitching detection processing takes time, in general. For this reason, when a moving image, or a video, is streamed in real time, the frame rate decreases and the latency increases, and the frame rate and the latency are not satisfactory enough. In addition, the technology in which an object distance of an object for stitching is fixed is not sufficiently satisfactory, because stitching for an object located at a distance other than the fixed distance is failed to be performed.

In view of the above-described background, when a plurality of images captured by a plurality of wide-angle lenses or fisheye lenses and having overlapping areas that overlap each other are combined, there has been a demand for achieving both accuracy and speed in image stitching processing performed according to an object distance.

According to an embodiment of the present disclosure, when a plurality of images having an overlapping area are to be combined, the images can be stitched according to an object distance while the image stitching is achieving both processing accuracy and processing speed.

In the above-described example embodiment, a computer can be used with a computer-readable program, described by object-oriented programming languages such as C++, C#, JAVA (registered trademark), or legacy programming languages such as machine language, assembler language, C language to control functional units used for the apparatus or system. The computer software can be provided to the programmable device using any storage medium or carrier medium for storing processor-readable code such as a floppy disk, a Compact Disk Read Only Memory (CD-ROM), a CD-Rewritable CD-(RW) a Digital Versatile Disk Read Only Memory (DVD-ROM), a DVD Recording only/Rewritable (DVD-R/RW), a Blu-ray disc, an Electrically Erasable and Programmable Read Only Memory (EEPROM), an Erasable Programmable Read Only Memory (EPROM), a memory card or stick such as USB memory, a memory chip, a Mini Disk (MD), a Magneto Optical disc (MO), magnetic tape, a hard disk in a server, a solid state memory device or the like, but not limited these. A part of the functions of the above-described embodiments or all functions of the above-described embodiments may be implemented by one or more processing circuits. A processing circuit includes a programmed processor, as a processor includes circuitry. A processing circuit includes a programmable device (PD) such as a Field Programmable Gate Array (FPGA) for example. A processing circuit also includes devices such as an application specific integrated circuit (ASIC) and conventional circuit components arranged to perform the recited functions. It is also possible to distribute them storing a recording medium as data described in circuit configuration data (bit stream data) downloaded to the PD to implement the functional blocks on the PD, Hardware Description Language (HDL) for generating the circuit configuration data, Very High speed integrated circuits hardware Description Language (VHDL), and Verilog-HDL etc.

Numerous additional modifications and variations are possible in light of the above teachings. It is therefore to be understood that, within the scope of the appended claims, the disclosure of this patent specification may be practiced otherwise than as specifically described herein. As can be appreciated by those skilled in the computer arts, this disclosure may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present disclosure may also be implemented by the preparation of application-specific integrated circuits or by interconnecting an appropriate network of conventional component circuits, as will be readily apparent to those skilled in the relevant art.

The present disclosure further includes the following aspects.

Aspect 1

An image processing apparatus includes an image input unit to input at least a first captured image and a second captured image.

The first captured image and the second captured image have an overlapping area. The overlapping area in the first captured image has a plurality of target areas in each of which a stitching position is to be obtained. In the plurality of target areas in the overlapping area of the first captured image, a size of a long-distance area having an object distance that is relatively long is different from a size of a short-distance area having an object distance that is relatively short.

Aspect 2

In the image processing apparatus according to Aspect 1, the size of the long-distance area, which is one of the plurality of target areas, is greater than the size of the short-distance area.

Aspect 3

The image processing apparatus according to Aspect 1 further includes a setting unit to set the plurality of target areas.

Aspect 4

The image processing apparatus according to Aspect 3 further includes a calculation unit to calculate a position of each of a plurality of corresponding areas in the second captured image.

Each of the plurality of corresponding areas matches a corresponding one of the plurality of target areas.

Aspect 5

In the image processing apparatus according to Aspect 4, the plurality of target areas are arranged in an orthogonal direction with respect to a direction in which the first captured image and the second captured image are arranged.

Aspect 6

An image processing system includes an image input unit to input at least a first captured image and a second captured image.

The first captured image and the second captured image have an overlapping area. The overlapping area in the first captured image has a plurality of target areas in each of which a stitching position is to be obtained. In the plurality of target areas in the overlapping area of the first captured image, a size of a long-distance area having an object distance that is relatively long is different from a size of a short-distance area having an object distance that is relatively short.

Aspect 7

In the image processing system according to Aspect 6, the size of the long-distance area, which is one of the plurality of target areas, is greater than the size of the short-distance area.

Aspect 8

An imaging apparatus includes a first image capturing device to capture an image in a first direction to generate a first captured image, and a second image capturing device to capture another image in a second direction to generate a second captured image. The first direction and the second direction are different from each other.

The first captured image and the second captured image have an overlapping area. The overlapping area in the first captured image has a plurality of target areas in each of which a stitching position is to be obtained. In the plurality of target areas in the overlapping area of the first captured image, a size of a long-distance area having an object distance that is relatively long is different from a size of a short-distance area having an object distance that is relatively short.

Aspect 9

In the imaging apparatus according to Aspect 8, the size of the long-distance area, which is one of the plurality of target areas, is greater than the size of the short-distance area.

Aspect 10

An image processing method includes receiving an input of a first captured image and an input of a second captured image, and obtaining a stitching position in an overlapping area of the first captured image and the second captured image.

The overlapping area in the first captured image has a plurality of target areas in each of which a stitching position is to be obtained. In the plurality of target areas in the overlapping area of the first captured image, a size of a long-distance area having an object distance that is relatively long is different from a size of a short-distance area having an object distance that is relatively short.

Aspect 11

In the image processing method according to Aspect 10, the size of the long-distance area, which is one of the plurality of target areas, is greater than the size of the short-distance area.

Aspect 12

A non-transitory recording medium storing a plurality of instructions which, when executed by one or more processors, causes the one or more processors to perform a method.

The method includes receiving at least an input of a first captured image and an input of a second captured image.

The first captured image and the second captured image have an overlapping area. The overlapping area in the first captured image has a plurality of target areas in each of which a stitching position is to be obtained. In the plurality of target areas in the overlapping area of the first captured image, a size of a long-distance area having an object distance that is relatively long is different from a size of a short-distance area having an object distance that is relatively short.

Aspect 13

In the non-transitory recording medium according to Aspect 12, the size of the long-distance area, which is one of the plurality of target areas, is greater than the size of the short-distance area.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image processing apparatus, comprising circuitry configured to:

input at least a first captured image and a second captured image, the first captured image and the second captured image having an overlapping area, the overlapping area in the first captured image having a plurality of target areas in each of which a stitching position is to be obtained, the plurality of target areas being arranged in an orthogonal direction with respect to a direction in which the first captured image and the second captured image are arranged and having a corresponding plurality of sizes different from each other, wherein:

the first captured image and the second captured image are to be one of a spherical image and a panoramic image, the plurality of target areas includes two target areas including a first target area and a second target area, the first target area and the second target area are arranged in a vertical direction with an equator as a boundary, and the first target area has a size less than the size of the second target area.

2. The image processing apparatus of claim 1, wherein: the circuitry is further configured to determine the plurality of target areas.

3. The image processing apparatus of claim 2, wherein: the circuitry is further configured to calculate a position of each of a plurality of corresponding areas in the second captured image, each of the plurality of corresponding areas matching a corresponding one of the plurality of target areas.

4. The image processing apparatus of claim 1, wherein: the first target area includes an object in a distance shorter from the image processing apparatus than a distance of another object included in the second target area.

5. The image processing apparatus of claim 3, wherein: the circuitry is further configured to combine the first captured image and the second captured image to generate a combined image based on the position calculated for each of the plurality of target areas.

6. The image processing apparatus of claim 3, wherein: the first captured image and the second captured image have an additional overlapping area that is different from the overlapping area, and the circuitry is further configured to:

determine a plurality of additional target areas in the additional overlapping area to obtain an additional stitching position in each of the plurality of additional target areas; and calculate a position of each of a plurality of additional corresponding areas each of which matches a corresponding one of the plurality of additional target areas.

7. The image processing apparatus of claim 3, wherein the circuitry is further configured to:

scan for a position of one of the plurality of corresponding areas in relation to a corresponding one of the plurality of target areas;

evaluate a matching score of an image of the corresponding one of the plurality of target areas and another image of the one of the plurality of corresponding areas; and obtain the position of the one of the plurality of corresponding areas, the matching score for the obtained position of the one of the plurality of corresponding areas indicating a maximum score.

8. The image processing apparatus of claim 7, wherein the circuitry is further configured to:

scan for a position of the corresponding one of the plurality of target areas; and obtain a combination of the position of the corresponding one of the plurality of target areas and the position of the one of the plurality of corresponding areas, the matching score for the combination giving the maximum score.

9. The image processing apparatus of claim 1, wherein: the first captured image and the second captured image are images respectively captured by a first image capturing device and a second image capturing device, the first image capturing device and the second image capturing device being included in an imaging apparatus and capture images in directions that are different from each other with respect to a horizontal plane, the imaging apparatus being one of an apparatus integrated with the image processing apparatus and another apparatus provided separately from the image processing apparatus, the first captured image and the second captured image having, respectively, a first part and a second part that are overlapping with each other and being to be arranged side by side horizontally, the orthogonal direction being a vertical direction, the imaging apparatus being provided with an installation part at one of an upper portion and a lower portion of the imaging apparatus.

10. The image processing apparatus of claim 5, wherein: the first captured image, the second captured image, and the combined image are images each of which is represented by a polar coordinate system having two arguments.

11. An imaging apparatus, comprising:

a first image capturing device to capture a first image in a first direction to generate a first captured image; and a second image capturing device to capture a second image in a second direction to generate a second captured image, the first direction and the second direction being different from each other;

the first captured image and the second captured image having an overlapping area, the overlapping area in the first captured image having a plurality of target areas in each of which a stitching position is to be obtained, the plurality of target areas being arranged in an orthogonal direction with respect to a direction in which the first captured image and the second captured image are arranged and having a corresponding plurality of sizes different from each other, wherein:

the first captured image and the second captured image are to be one of a spherical image and a panoramic image, the plurality of target areas includes two target areas including a first target area and a second target area, the first target area and the second target area are arranged in a vertical direction with an equator as a boundary, and the first target area has a size less than the size of the second target area.

12. The imaging apparatus of claim 11, further comprising circuitry configured to:

perform distortion correction on a first partial image and a second partial image that are the first image and the second image, respectively, to generate the first captured image and the second captured image.

13. An image processing method, comprising:

receiving an input of a first captured image and an input of a second captured image; and obtaining, in the first captured image, a stitching position in an overlapping area of the first captured image and the second captured image, wherein the overlapping area in the first captured image has a plurality of target areas in each of which a stitching position is to be obtained, the plurality of target areas is arranged in an orthogonal direction with respect to a direction in which the first captured image and the second captured image are arranged and has a corresponding plurality of sizes different from each other, wherein:

the first captured image and the second captured image are to be one of a spherical image and a panoramic image, the plurality of target areas includes two target areas including a first target area and a second target area, the first target area and the second target area are arranged in a vertical direction with an equator as a boundary, and the first target area has a size less than the size of the second target area.

14. The image processing method of claim 13, further comprising:

combining the first captured image and the second captured image based on a position obtained for each of the plurality of target areas.

15. A video conference system, comprising:
the image processing apparatus according to claim 1.

16. A video conference system, comprising:
the imaging apparatus according to claim 11.

17. A video conference method, comprising:
performing a video conference method using the image processing method of claim 13.

* * * * *